US010132944B2

(12) United States Patent
Stanchina et al.

(10) Patent No.: US 10,132,944 B2
(45) Date of Patent: Nov. 20, 2018

(54) METHOD FOR CALIBRATING AN IONISING RADIATION DETECTOR AND ASSOCIATED DEVICE

(71) Applicants: COMMISSARIAT À L'ÉNERGIE ATOMIQUE ET AUX ÉNERGIES ALTERNATIVES, Paris (FR); MORPHO, Issy les Moulineaux (FR)

(72) Inventors: Sylvain Stanchina, Grenoble (FR); Guillaume Montemont, Grenoble (FR)

(73) Assignees: COMMISSARIAT À L'ÉNERGIE ATOMIQUE ET AUX ÉNERGIES ALTERNATIVES, Paris (FR); IDEMIA IDENTITY & SECURITY FRANCE, Issy les Moulineaux (FR)

( * ) Notice: Subject to any disclaimer, the term of this patent is extended or adjusted under 35 U.S.C. 154(b) by 0 days.

(21) Appl. No.: 15/538,494

(22) PCT Filed: Dec. 18, 2015

(86) PCT No.: PCT/EP2015/080658
§ 371 (c)(1),
(2) Date: Jun. 21, 2017

(87) PCT Pub. No.: WO2016/102404
PCT Pub. Date: Jun. 30, 2016

(65) Prior Publication Data
US 2017/0350995 A1 Dec. 7, 2017

(30) Foreign Application Priority Data
Dec. 22, 2014 (FR) .................................. 14 63093

(51) Int. Cl.
*G01T 1/29* (2006.01)
*G01T 7/00* (2006.01)
*G01T 1/36* (2006.01)

(52) U.S. Cl.
CPC ............ *G01T 7/005* (2013.01); *G01T 1/2928* (2013.01); *G01T 1/2935* (2013.01); *G01T 1/365* (2013.01)

(58) Field of Classification Search
CPC ............................. G01T 1/2985; G01T 1/2935
See application file for complete search history.

(56) References Cited

U.S. PATENT DOCUMENTS

2003/0205676 A1* 11/2003 Nelson ................. A61B 6/4233
250/370.09
2011/0297838 A1* 12/2011 Wangerin ............. G01T 1/2928
250/370.09

(Continued)

FOREIGN PATENT DOCUMENTS

FR    2 950 979 A1    4/2011

OTHER PUBLICATIONS

U.S. Appl. No. 15/538,476 with the title "Method for Calibrating an Ionising Radiation Detector and Associated Device" dated Jun. 21, 2017.

(Continued)

*Primary Examiner* — Casey Bryant
(74) *Attorney, Agent, or Firm* — Pearne & Gordon LLP

(57) ABSTRACT

A method for calibrating an ionizing radiation detector, with the aim of determining a correction factor in order to establish an amplitude-energy correspondence. The invention first relates to a method for calibrating a device for detecting ionizing radiation, the detector comprising a semiconductor or scintillator detection material capable of generating a signal S of amplitude A upon interaction between ionizing radiation and the detection material, the method including the determination of a weighting factor at the amplitude A.

16 Claims, 7 Drawing Sheets

(56) References Cited

U.S. PATENT DOCUMENTS

2017/0343686 A1* 11/2017 Stanchina ............. G01T 1/2928
2017/0350995 A1* 12/2017 Stanchina ............. G01T 1/2928

OTHER PUBLICATIONS

Zhong, H., et al., "1-D position sensitive single carrier semiconductor detectors", Nuclear Instruments and Methods in Physics Research, Section A, vol. 380 (Oct. 1, 1996), pp. 228-231.
French Search Report issued in Patent Application No. FR 1463093 dated Nov. 6, 2015.
International Search Report Issued in Patent Application No. PCT/EP2015/080658 dated Mar. 9, 2016.
Written Opinion Issued in Patent Application No. PCT/EP2015/080658 dated Mar. 9, 2016.

* cited by examiner

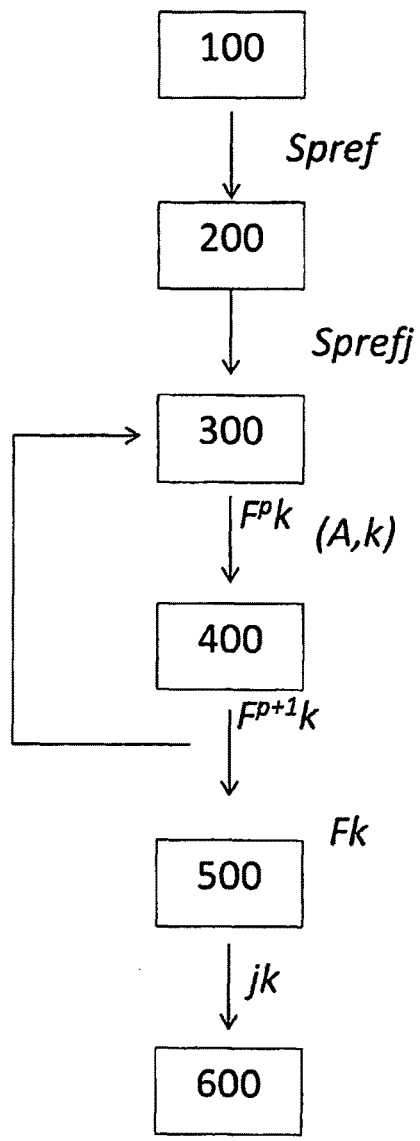
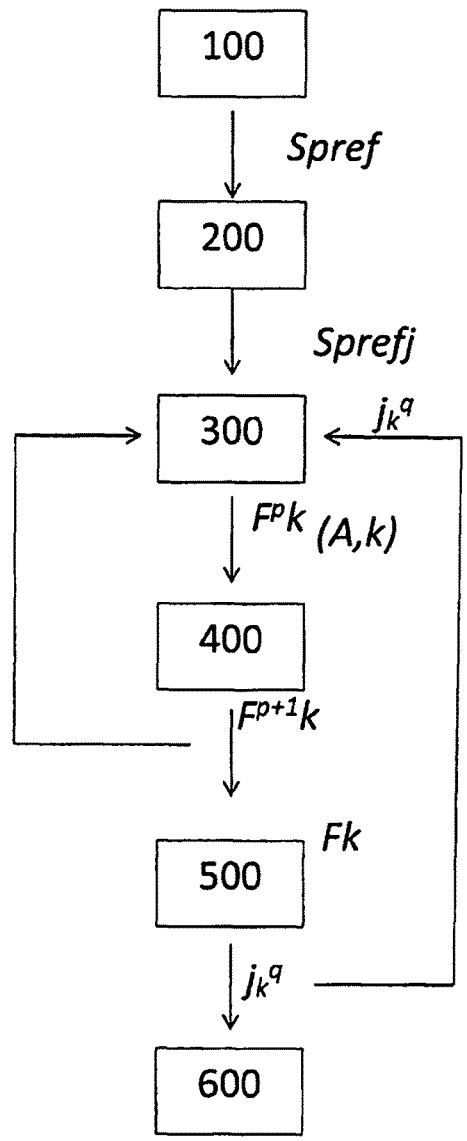
FIG 2A  FIG 2B

METHOD FOR CALIBRATING AN IONISING RADIATION DETECTOR AND ASSOCIATED DEVICE

TECHNICAL DOMAIN

The invention relates to ionising radiation detectors, particularly for X-ray or gamma photon radiation, for applications in the nuclear and medical fields and for non-destructive testing.

STATE OF PRIOR ART

Some devices for the detection of ionising radiation make use of semiconducting detection materials of the CdTe, CdZnTe type polarised by electrodes. A cathode and an anode are usually arranged on two opposite faces of the detection material. These electrodes are used for polarisation of the detection material. They can also be used to collect charge carriers generated by interactions of ionising radiation in the detection material.

Each interaction, including photoelectric interaction or Compton diffusion or even the creation of pairs, generates several hundreds or even thousands of pairs of electron-holes. Electrons migrate to the anode(s), while holes migrate to the cathode(s). Thus, an interaction is an event that generates charge carriers in the semiconducting material, these charges migrating towards the electrodes polarising the detector.

Due to improved mobility properties in currently used semiconducting materials, electrodes collected by the anode generate an electronic signal that can be used to estimate energy lost by ionising radiation during the interaction, or energy of the event. Electronic circuits connected to the anode amplify and shape the signal in the form of a pulse for which the height or the integral depend on the energy of the event, often linearly.

Each electrode (the cathode and the anode) can be segmented into several elementary electrodes. For applications related to imagery, the anode is usually divided into a matrix of elementary anodes, each elementary anode forming one pixel of the detector.

One difficulty related to this type of detector is that the signal collected by an electrode depends on the location of the event in the detector. For example, an interaction releasing the same energy and therefore the same number of charge carriers, does not produce the same signal if it occurs close to the cathode or close to the anode. Furthermore, in the case in which an electrode is segmented into different elementary electrodes, the signal produced by an interaction depends on the position of the interaction relative to the elementary electrodes. For example, if the elementary electrodes are distributed in a matrix, the signal generated by an interaction depends on the location of the interaction in the plane of the matrix.

Thus, a signal collected by an electrode depends not only on the energy released by the interaction that generated this signal, but also on the position of the interaction in the detection material. In other words, the response of the detector is not spatially uniform, and depends on the interaction location.

The invention described in this application provides a solution to this problem.

PRESENTATION OF THE INVENTION

A first purpose of the invention is a method for calibration of an ionising radiation detector to determine a correction factor as a function of the interaction location in the detector.

More precisely, a first purpose of the invention is a method of calibrating an ionising radiation detection device, the detector comprising a semiconducting detection material extending between two electrodes, at least one electrode being capable of generating a signal S with amplitude A during interaction of ionising radiation in said detection material, the method including the following steps:
  a) irradiation of the detector using a known reference source so as to generate interactions in the detector,
  b) selection of a plurality of correction factors j, and determination of a plurality of reference spectra $Spref_j$, each reference spectrum being associated with a correction factor j, each reference spectrum representing a distribution of an amplitude A of the signal S generated when the detector is irradiated by said reference source Sref, the amplitude A of the signal S being weighted by said correction factor j,
  c) detection of a plurality of interactions in the detector during said irradiation and, for each interaction, measurement of the amplitude A of an electronic signal S generated by at least one electrode and determination of the value k of at least one position parameter of the interaction as a function of said signal S.
  d) for a plurality of values k of said position parameter, determination of a calibration function $F_k$ such that
    each calibration function $F_k$ is associated with one of said values k of said position parameter
    each calibration function $F_k$ is defined on a plurality of correction factors j,
    each term $F_k(j)$ of said calibration function represents a probability associated with said correction factor j when the position parameter is equal to the value k,
    each term $F_k(j)$ being updated, at each interaction for which the position parameter is equal to the value k with which said calibration function $F_k$ is associated, combining said amplitude A measured during this interaction with each reference spectrum $Sp_{ref,j}$,
  e) determination of a correction factor $j_k$ associated with each value k of the position parameter by identifying a remarkable point of said calibration function $F_k$ A correction function J was thus established associated with said position parameter in which, for each value k of this position parameter, $J(k)=j_k$.

The calibration method then consists of associating a correction factor $j_k$ for a plurality of values k of said position parameter, each factor being associated with a value k.

This factor will be used during the operating phase of the detection device when, having been exposed to ionising radiation, the detector generates signals under the effect of interactions that occur in the detection material. A value k of a position parameter is assigned to each interaction, and the amplitude of the signal that it generates is then weighted by the correction factor $j_k$ corresponding to said value k.

This calibration can be made automatically without assistance by a user, when the detector comprises one or a plurality of measurement channels. It can also address several position parameters simultaneously, and particularly an interaction position between the anode and the cathode and a position in the anode plane. It then takes account of the 3D position of the interaction.

Correction function associated with a position parameter means a function J for which the variable k is the value of said position parameter, the correction function J(k) indicating which correction factor $j_k$ should be applied for each value k of the position parameter.

The value k of the position parameter can be between a minimum value kmin and a maximum value kmax, such that kmin≤k≤kmax. kmin and kmax depend on the position parameter considered and can be predetermined.

The correction function can be defined on a few discrete values k and then interpolated between these different discrete values, so as to be defined within an interval [kmin–kmax]. In other words, the correction factors $j_k$ can be determined for a few discrete values k between the minimum value kmin and the maximum value kmax, the correction factor associated with a value between two discrete values then being obtained by interpolation, for example by linear interpolation.

Step b) can include:
i load an initial reference spectrum $Sp_{ref}$ previously saved in a memory, corresponding to said reference source $S_{ref}$, this spectrum $Sp_{ref}$ representing the distribution of the amplitude of the detected signal when the detector is irradiated by said reference source $S_{ref}$,
ii starting from the initial reference spectrum $Sp_{ref}$, determine a plurality of reference spectra $Sp_{ref,j}$, each reference spectrum $Sp_{ref,j}$ having been obtained from the initial reference spectrum $Sp_{ref}$, each value $Sp_{ref,j}(i)$ of the reference spectrum being obtained from the value Spref (i/j).

The term correction factor denotes a positive number j that will modulate the reference spectrum Spref corresponding to the reference source, by normalising the variable i, corresponding to the amplitude (or energy) so as to establish a reference spectrum associated with the correction factor j $Spref_j$ such that $Spref_j(i/j) = Spref(i) \times K_{norm}(j)$, the term $K_{norm}(j)$ being equal to a standardisation term that can be equal to 1 or 1/j.

The correction factors j considered can be determined arbitrarily between a minimum value $j_{min}$ and a maximum value $j_{Max}$. These are positive discrete values distributed between the values $j_{min}$ and $j_{Max}$. Preferably, $j_{min} < 1 < j_{Max}$.

Step c) can include:
at each detected interaction, determine the amplitude A, A' of at least two signals S, S' generated by electrodes E, E' respectively and determine the value k of a position parameter of the interaction in the detector as a function of these signals S, S', and particularly by combining the amplitudes A, A', for example in the form of a ratio A'/A.

Step d) can include the following steps:
i initialise each calibration function $F_k$ associated with each value k of said position parameter
ii at each detected interaction, determine the value k of said position parameter and update the corresponding calibration function $F_k$, by adding the value of the corrected reference spectrum $Spref_j(A)$ to each term $F_k(j)$ in this function, at said amplitude A,
iii repeat step ii until a predefined stop criterion is reached.

In particular, the calibration function $F_k$ can be initialised such that $F_k(j) = F_k^0(j)$, each value $F_k^0(j)$ representing the initial value of the term $F_k(j)$. All the initial values $F_k^0(j)$ can be equal to the same number, for example 0.

The predefined stop criterion can be a predetermined number of days for each calibration function $F_k$, or a predefined detector irradiation time, or a predefined number of detected interactions, or a maximum value reached by one or several terms $F_k(j)$ of one or several calibration functions $F_k$.

During step e), the correction factor $j_k$ associated with the value k of the position parameter can be determined by identifying the value of j that maximises the value of the calibration function $F_k$, in which case:

$$j_k = \text{argmax}_j[F_k(j)]$$

The method according to the invention can comprise one of the characteristics described below, taken alone or in any technically feasible combination.

The electrodes corrected to the detector material include at least one cathode and at least one anode. According to some embodiments:
the anode comprises a plurality of elementary anodes, particularly coplanar, and particularly in matrix form, and/or,
the cathode comprises a plurality of elementary cathodes, particularly coplanar, and particularly in matrix form.

The position parameter of an interaction can be determined by combining signals resulting from said interaction, derived from different electrodes, and for example
by an anode and a cathode, or
by two elementary anodes, in particular the two elementary anodes being located in the same plane, or
by two elementary cathodes, in particular the two elementary cathodes being located in the same plane.

The position parameter of an interaction can be determined by combining the signals:
from the elementary anode that collected the signal with the maximum amplitude, called the winning anode, and
from the elementary anode adjacent to the winning anode that collected the signal with the maximum amplitude, called the secondary anode,
in which case the value of the position parameter depends on the position of the interaction in the plane of the winning anode and the secondary anode. In particular, the position parameter of an interaction can be obtained by taking a ratio of the amplitude of the signal measured by the secondary anode to the amplitude of the signal measured by the winning anode.

The position parameter of an interaction can be determined by combining the signals:
from the elementary anode that collected the signal with the maximum amplitude, called the winning anode, and
from the cathode or if the cathode is distributed in several elementary cathodes, from the elementary anode that collected the signal with the maximum amplitude,
in which case the value of the position parameter depends on the position of the interaction between the winning anode and the cathode, called the detection depth, and frequently referred to by the acronym DOI (Depth of Interaction). In particular, the position parameter of an interaction can be obtained by taking a ratio of the amplitude of the signal measured by the cathode to the amplitude of the signal measured by the winning anode.

The initial reference spectrum Spref or each reference spectrum $Spref_j$ preferably comprises one or a plurality of significant peaks isolated from each other. Preferably, the number of significant peaks $P_1 \ldots P_n$ forming the reference spectrum is between 1 and 10. A significant peak refers to a peak that is more the 2 times, and preferably more than 5 times the background noise level on each side of this peak.

According to one example, step d) comprises an iterative update of the calibration function $F_k$ such that
For all values of j between $j_{min}$ and $j_{max}$, $$F_k^p(j) = F_k^{p-1}(j) + Spref_j(A)$$

in which:
$F_k^{p-1}(j)$ is the value of the term $F_k(j)$ before the $p^{th}$ iteration,
$F_k^p(j)$ is the value of the term $F_k(j)$ after the $p^{th}$ iteration, A is the amplitude of the signal S measured by an electrode following an interaction for which the value of the position parameter is equal to k. In this example, the signal $S_{A0}$ measured by the winning anode A0 is considered, therefore $A=A_{A0}$.

p is the iteration index corresponding to the rank of the update. During the first update, p=1.

Step d) can then be reiterated for a predetermined number of iterations, or until the correction function $F_k$(j) associated with the value k no longer changes significantly between two successive updates, or reaches a predetermined value for a correction factor j. In general, step d) is repeated until a predetermined stop criterion is reached.

According to one variant:
- steps c), d) and e) are repeated iteratively for the same value k of the position parameter, each step e) leading to the determination of a partial correction factor $j_k^q$, where q denotes the iteration rank,
- and, following the first iteration, step d) comprises the update of each term $F_k$(j) by weighting said amplitude A by the product of partial correction factors $j_k^1 \ldots j_k^q$, associated with the value k of the position parameter of the interaction, these values having been determined during the previous q iterations.

Step e) in the last iteration of the method then consists of determining the correction factor $j_k$ associated with each value k of the position parameter as a function of the product of partial correction factors $j_k^1 \ldots j_k^Q$ determined during Q successive iterations.

Thus, a first determination of correction factors $j_k$ associated with a plurality of values k of a position parameter is made using steps a) to e) described above, these partial correction factors being denoted $j_k^1$. Steps c), d) and e) are then reiterated and during the update to the calibration function $F_k$ associated with each value k of the position parameter, the amplitude A of the signal S is weighted by the partial correction factor $j_k^1$ corresponding to said previously determined value k.

In general, during each interaction q, steps c), d) and e) are reiterated so as to obtain a partial correction factor $j_k^q$ and, during the next iteration, the update to the calibration function $F_k$ associated with each value k of the position parameter is made by weighting the amplitude A of the signal S by the products of partial correction factors $j_k^1 \ldots j_k^q$ corresponding to said previously determined value k.

According to one embodiment, each interaction can be characterised by a plurality of position parameters, each position parameter rank i having the value $k_i$.

In this case, the method uses steps a) and b) similar to the steps described above. Step c) includes the determination of a set of N interaction position parameters as a function of the signal S, where N is integer larger than 1, in which case step d) comprises the selection of one position parameter i among the N position parameters, and for a plurality of values $k_i$ of said $i^{th}$ position parameter, the determination of a calibration function $F_{ki}$ such that:
- each calibration function $F_{ki}$ is associated with one of said values ki of said position parameter
- each term $F_{ki}$(j) of said calibration function represents a probability associated with said correction factor j when the position parameter is equal to the value $k_i$,
- each term $F_{ki}$(j) being updated at each interaction for which the $i^{th}$ position parameter is equal to the value ki with which said calibration function $F_{ki}$ is associated, by weighting the amplitude A measured during this interaction, by at least one correction factor $j_{kn}$, said correction factor $j_{kn}$, being determined as a function of the value $k_n$ of an $n^{th}$ position parameter characterising the interaction, and combining the amplitude A thus weighted with each reference spectrum $Sp_{ref}$j.

The $i^{th}$ and $n^{th}$ position parameters mean position parameters with ranks i and n respectively in the set composed of the N position parameters characterising each interaction.

According to this embodiment, step e) includes the determination of the correction factor $j_{ki}$ associated with each value $k_i$ of the $i^{th}$ position parameter as a function of said calibration function $F_{ki}$ associated with the $i^{th}$ position parameter, and particularly as a function of a remarkable point of this function, for example its maximum.

The correction factors $j_{kn}$ are either determined in advance, or initialised to an initial value $j_{kn}^0$.

For example, during step e), the correction factor $j_{ki}$ associated with the value $k_i$ of the $i^{th}$ position parameter is obtained by the relation $$j_{ki} = \mathrm{argmax}_j[F_{ki}(j)].$$

A correction function $J_i$ was thus established associated with said $i^{th}$ position parameter in which, for each value $k_i$ of this position parameter, $J_i(k_i)=j_{ki}$.

Correction function associated with an $i^{th}$ position parameter means a function i for which the variable $k_i$ is the value of said $i^{th}$ position parameter, the correction function $J_i(k_i)$ indicating the position parameter $j_{ki}$ for each value $k_i$.

In this embodiment, step d) can comprise:
i initialise each calibration function $F_{ki}$ associated with each value $k_i$ of the ith position parameter $k_i$,
ii at each detected interaction
   determine values $(k_1 \ldots k_i \ldots k_N)$ of the N position characterising the interaction,
   weight the value of the amplitude A measured during this interaction by at least one correction factor $j_{kn}$ dependent on the value $k_n$ of an $n^{th}$ position parameter characterising the interaction,
   to each term $F_{ki}$(j) of said calibration function, add the value of the corrected reference spectrum $Spref_j$ (A*), where A* represents the value of the weighted amplitude,
iii repeat step ii until a stop criterion is reached.

For example, during this step d), each function $F_{ki}$, associated with the value ki of an $i^{th}$ position parameter is iteratively updated using the following expression:

For any value of j between $j_{min}$ and $j_{max}$, $$F_{ki}^p(j) = F_{ki}^{p-1}(j) + \mathrm{Spref}j(\Pi_{i=1}^{N_j} j_{kn} \times A)$$

in which:
$F_{ki}^{p-1}$(j) is the value of the term $F_{ki}$(j) before the update,
$F_{ki}^p$(j) is the value of the term $F_{ki}$(j) after the update,
A is the amplitude of the signal S measured by an electrode following each interaction for which the value of the $i^{th}$ position parameter is equal to $k_i$. In this example, the signal $S_{A0}$ measured by the winning anode A0 is considered, therefore $A=A_{A0}$,
$j_{kn}$ correspond to correction factors corresponding to one or several position parameters characterising the interaction, these parameters either being determined in advance or initialised to an initial value as explained below,
p is the iteration index. During the first update, p=1.

According to this embodiment, when a correction parameter $j_{kn}$ has not been determined in advance, its value is set to an initial value, for example equal to 1. Thus, before the steps described above, the method comprises an initialisation phase during which each correction parameter $j_{kn}$ is assigned an initial arbitrary value, for example equal to 1.

In one embodiment, steps c), d) and e) described above taking account of a plurality of position parameters, are performed sequentially selecting a different $i^{th}$ position parameter each time. In other words, these three steps c), d) and e) are performed:

for a first position parameter so as to determine a correction function $J_1$ associated with said first position parameter, in which for each value $k_1$ of this position parameter, $J_1(k_1)=j_{k1}$, step d) being used assuming correction factors $j_{k1} \ldots j_{kN}$ equal to an arbitrary initial value $J_{k1}^0 \ldots j_{kN}^0$, for example equal to 1, for an $n^{th}$ position parameter, where $1<n\leq N$, so as to determine a correction function $J_n$ associated with said $n^{th}$ position parameter in which, for each value $k_n$ of this position parameter, $J_n(k_n)=j_{kn}$, step d) being implemented by weighting the amplitude A measured by previously determined correction parameters $j_{k1} \ldots j_{kn-1}$, and correction parameters $j_{kn+1} \ldots j_{kN}$ equal to an arbitrary initial value, for example 1.

According to one variant:

steps c), d) and e) are repeated iteratively for the same value ki of the $i^{th}$ position parameter, each step e) leading to the determination of a partial correction factor $j_{ki}^{qi}$, where $q_i$ denotes the iteration rank, and, following the first iteration, step d) comprises the update of each term $F_{ki}(j)$ by weighting said amplitude A by the product of partial correction factors $j_{ki}^1 \ldots j_{ki}^{qi}$, associated with the value ki of the $i^{th}$ position parameter of the interaction, these factors $j_{ki}^1 \ldots j_{ki}^{qi}$ having been determined during the previous $q_i$ iterations.

Step e) of the last iteration of the method then consists of determining the correction factor $j_{ki}$ associated with each value ki of the $i^{th}$ position parameter as a function of the product of partial correction factors $j_{ki}^1 \ldots j_{ki}^{Qi}$ determined during $Q_i$ successive iterations, where $Q_i$ denotes the number of necessary iterations.

In general, according to this variant, during each interaction $q_i$, steps c), d) and e) are reiterated so as to obtain a partial correction factor $j_{ki}^{qi}$ and, during the next iteration, the update to the calibration function $F_{ki}$ associated with said value $k_i$ of the $i^{th}$ position parameter is made by weighting the amplitude A of the signal S by the product of previously determined partial correction factors $j_{ki}^1 \ldots j_{ki}^{qi}$ associated with the value ki of the $i^{th}$ position parameter. The product $j_{ki}^1 \ldots j_{ki}^{qi}$ corresponds to a so-called intermediate correction factor associated with the value ki of the $i^{th}$ position parameter.

Preferably, during step d), the calibration function $F_{ki}$ is updated by also weighting the amplitude A by a weighting factor K, this factor being obtained from the product of correction factors $j_{kn}$, or partial correction factors $j_{kn}^1 \ldots j_{kn}^{qn}$ associated with values $k_n$ of the other position parameters of the interaction.

A second purpose of the invention is a device for the detection of ionising radiation, for implementation of the method described above. Such a device comprises particularly:

a) a detector, comprising a semiconducting detection material extending between two electrodes, the detector being capable of generating charge carriers under the effect of an interaction with ionising radiation, b) an electronic processing circuit capable of forming a signal S from charge carriers collected by an electrode during an interaction and determining its amplitude A, c) an electronic localisation circuit, capable of determining the value of at least one position parameter at said interaction in the detection material from different electrodes, d) an electronic calibration circuit configured to implement steps b), c) and d) and e) in the method described above.

A third purpose of the invention is a method for detection of ionising radiation using a detector, particularly a semiconducting detector extending between two electrodes, the method including the following steps:

a) irradiation of a detector using an ionising radiation source, b) for each detection of an interaction of ionising radiation in the detector, formation of at least one signal S under the effect of said interaction, the signal S being collected by an electrode E, and determination of values $k_1 \ldots k_N$ of N position parameters of the interaction, $N\geq 1$, starting from said signal S, c) determination of at least one correction factor $j_{ki}$ as a function of the value $k_1 \ldots k_N$ of each correction parameter, d) correction of the amplitude A of a detected signal S by applying at least one correction factor $j_{ki}$ to it, determined as a function of the value $k_i$ of each position parameter characterising the interaction.

Each correction factor $j_{ki}$ associated with a given position parameter is then preferably produced using the previously described calibration method.

The amplitude correction is made particularly by weighting said amplitude by each correction factor $j_{ki}$ corresponding to the value $k_i$ of the $i^{th}$ position parameter.

Preferably, the set of correction factors associated with each position parameter is previously stored in a table called the correction table, defining a correspondence between the value $k_i$ of each correction parameter and the correction factor $j_{ki}$ corresponding to this value.

According to one variant, step b) includes the determination of N position parameters for each detected interaction, where $N\geq 2$, step c) includes correction of the amplitude of the detected signal S by applying a plurality of correction factors $j_{k1} \ldots j_{kN}$ to it, each correction factor being determined as a function of corresponding values $k_1 \ldots k_N$ of the position parameters, According to one embodiment, each correction factor $j_{ki}$ is a multiplication term applied to the amplitude A of the signal produced by the interaction. In other words, step c) includes multiplication of the amplitude A of the detected signal by one or several correction factors $j_{ki}$, each correction factor $j_{ki}$ depending on the value $k_i$ of the position parameter considered. The result obtained is then a corrected amplitude A* such that $A^*=\Pi_{i=1}^{i=N} j_{ki} \times A$.

For example, the position parameters of an interaction are coordinates $(X_{INT}, Y_{INT})$ in the anode plane and a coordinate $(Z_{INT})$ between the anode and the cathode, as mentioned above. In this case, the amplitude of each detected signal is corrected as a function of correction factors $j_{k1}$ and $j_{k2}$, each correction factor $j_{k1}$ and $j_{k2}$ depending on the corresponding values $k_1$, $k_2$ of each position parameter considered. In particular, the corrected amplitude A* is such that $A^*=j_{k1} \times j_{k2} \times A$.

A fourth purpose of the invention is an ionising radiation detection device comprising:

a) a detector, comprising a semiconducting detection material extending between two electrodes E, the detector being capable of generating charge carriers under the effect of an interaction with ionising radiation, b) an electronic processing circuit capable of forming a signal S from charge carriers collected by an electrode E during an interaction and determining its amplitude A, c) an electronic localisation circuit, capable of determining the value k of at least one position parameter of the interaction in the detection material from at least one signal collected by an electrode E, d) an electronic correction circuit configured to apply a correction factor $j_k$ to a detected signal S, corresponding to said value k of said position parameter, said correction factor being previously stored in a memory.

The correction factor $j_k$ can be determined by the calibration method described above.

Preferably, the electronic correction circuit applies the correction factor to a single detected signal S, for example to the anode, or to the winning anode if the anode comprises a plurality of elementary anodes.

According to one embodiment, step c) includes the determination of the value of at least N position parameters, where N is an integer number greater than 1, for example the interaction depth $Z_{INT}$ and the position of the interaction $(X_{INT}, Y_{INT})$ in the anode plane. In this case, during step d), the detected signal S is corrected by N correction factors $j_1 \ldots j_N$, each correction factor depending on the value of the position parameter with which it is associated. In particular, the amplitude of the detected signal is weighted by a product of N correction factors.

DESCRIPTION OF THE FIGURES

FIG. 2A represents the different steps of the calibration method, according to a first embodiment of the invention;

FIG. 2B represents the different steps of the calibration method, according to a variant of a first embodiment of the invention;

DETAILED PRESENTATION OF PARTICULAR EMBODIMENTS

Figure 1:
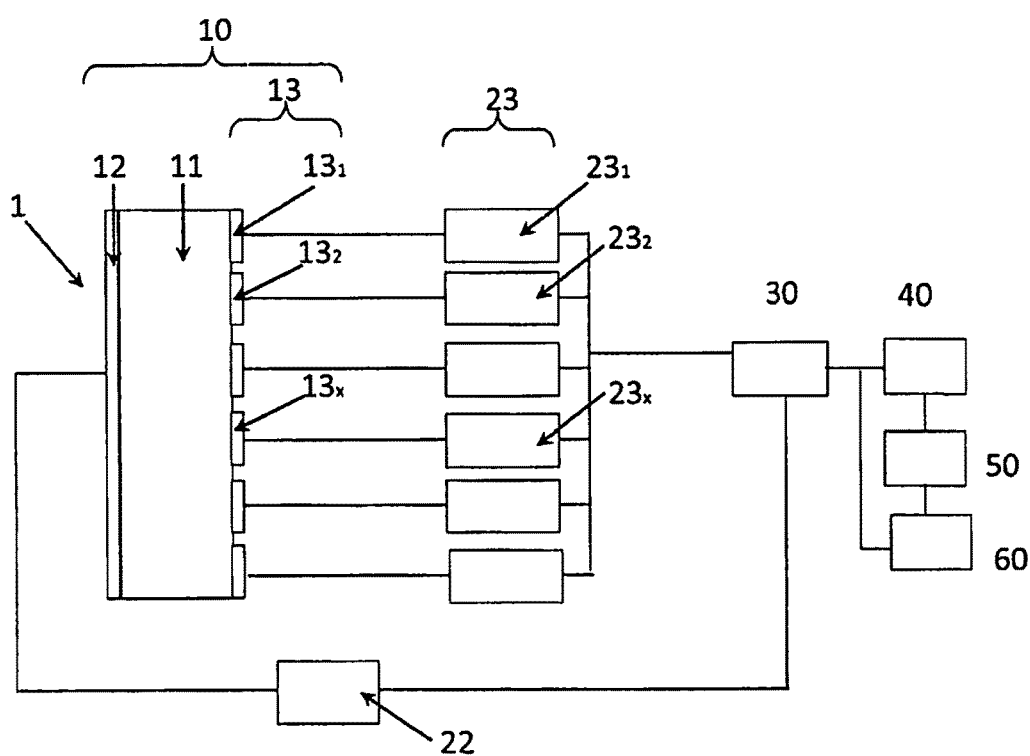
FIG. 1 represents a diagram of the detection device.

FIG. 1 represents a device 1 for the detection of ionising radiation according to the invention. It comprises a detector 10 made from a semiconducting material 11, that can be polarised by a cathode 12 and a matrix of elementary anodes 13. This matrix of anodes is composed of elementary anodes $13_1 \ldots 13_p$. The semiconducting is CdTe in this example. It could be another semiconducting material frequently used for the detection of ionising radiation (Si, CdZnTe . . . ). The thickness of the material is a few millimeters, for example 5 mm.

Electrons have better charge mobility properties in a CdTe type material. Also, signals giving more precise information about the energy deposited by an interaction in the detector are signals output from the elementary anode(s) $13_1 \ldots 13_x \ldots 13_p$.

In this example there is a single cathode 12, but in the same way as for the anode, it would be possible to envisage segmenting into multiple elementary cathodes.

Each elementary anode $13_x$ is made by placing a conducting material on the surface of the semiconducting material. The dimension of each elementary anode 13x is for example (to be done), the space between each elementary anode being from 50 nm to 3 mm, and preferably between 100 nm and 1 mm.

Symmetrically, the cathode 12 is made by placing a conducting material on the surface of the semiconducting material, usually on the surface opposite the surface on which the anode is located.

In this example, the detection material 11 is a 5 mm thick CdZnTe parallelepiped with 20 mm sides.

The device also comprises:

a first electronic amplification circuit $23_x$, associated with each elementary anode $13_x$ so as to produce an anode signal with an amplitude proportional to the number of charge carriers collected by the elementary anode after an interaction. Such a circuit is known and will not be described in detail, a second electronic amplification circuit $22_x$, associated with the cathode 12 so as to produce a cathode signal with an amplitude proportional to the number of charge carriers collected by the cathode after an interaction. Such a circuit is known and will not be described in detail. Such a circuit is optional.

Thus in general, each interaction in the detector leads to the collection of charge carriers by at least one electrode E (anode A or cathode K) so as to generate an electronic signal S with an amplitude A.

The term amplitude denotes the maximum height of a signal, when the signal is in the form of a pulse. It can also be the integral of this signal, or any other function of the maximum height or the integral. In general, the amplitude represents the quantity of charges collected by the E during an interaction.

An interaction frequently leads to the collection of charge carriers by several electrodes E, E', E" . . . the amplification circuit associated with each of these electrodes then producing signals S, S', S" . . . with amplitudes A, A', A" respectively. The term "winning" electrode denotes the electrode E that produces the signal S with maximum amplitude A.

Each amplification circuit ($23_x$, 22) may comprise an amplifier, applying a gain G to the electronic signal. The gain of each amplification circuit is determined in advance by an expert in the subject.

The detection device 1 also comprises an electronic localisation circuit 30 capable of determining the value k of a position parameter of the interaction in the detector 11.

Position parameter means a parameter determined using at least one signal S detected by an electrode, and dependent on the position of the interaction in the detector 11.

This position may be:

i a position between the cathode 12 and the anode 13, in other words a coordinate $Z_{INT}$ of the interaction along an axis between the cathode and the anode. This position, called the Depth of Interaction (DOI), is the distance $Z_{INT}$ between the interaction and the anode (or the cathode), ii a position in the plane of the anode 13, in other words a pair of coordinates $(X_{INT}, Y_{INT})$ of the interaction in the plane of the anode.

The electronic localisation circuit 30 determines the value k of the position parameter of an interaction using electronic signals S, S', S" generated by one or several electrodes E, E', E". The value of this position parameter is usually calculated using at least the signal S from the touched electrode, and particularly the touched anode, but this is not essential.

The position parameter k can be defined using a single electronic signal S: for example, if a single anode A0 among the different elementary anodes 13x collects a significant signal S, the value k of the position parameter corresponds to the position of the anode A0. It is then considered that the position of the interaction in the plane of the anode 13 corresponds to the coordinates $(X_0, Y_0)$ of the centre of the anode A0, these coordinates $(X_0, Y_0)$ forming the value of the position parameter.

A significant signal means a signal with an amplitude greater than a given threshold, this threshold being determined as a function of the electronic noise, so as to prevent false detections.

However, when the anodes are close enough to each other, the charge carriers can be distributed on several adjacent elementary anodes 13x. The elementary anode that collects the signal with the maximum amplitude is called the winning anode (or the touched anode) and is denoted A0. In the same way as in the previous section, the value of the position parameter of the interaction in the anode plane is $(X_0, Y_0)$.

The value k of a position parameter can be determined by combining at least two signals S, S' detected by the different electrodes E, E' respectively.

It can be a ratio between the amplitude of the signal from the cathode K, and the amplitude of the signal from the touched anode A0. The position parameter then indicates an interaction position between the winning anode A0 and the cathode K, which corresponds to the interaction depth $Z_{INT}$ defined above.

It can be a ratio between the amplitude of signals between two adjacent anodes, and particularly the signal from the secondary anode A1 and the signal from the winning anode A0, the secondary anode corresponding to the anode with the highest amplitude signal adjacent to the winning anode. The position of the interaction in the anode plane 12 becomes closer to the centre of the winning anode A0 as the ratio $A_{A1}/A_{A0}$ decreases. The distance of the interaction from the centre of the anode $A_{A0}$ increases as it moves towards the centre of the anode $A_{A1}$, as this ratio increases. When the ratio is equal to 1, the interaction is located between the winning anode and the secondary anode. When this ratio is equal to 0, the interaction is at the centre of the winning anode.

Naturally, several signals S, S', S", S''' output from adjacent electrodes E, E', E", E''' can be combined to obtain an even more precise determination of the position of the interaction in the anode plane.

The detection device 1 also comprises an electronic calibration circuit 40 capable of implementing the detector calibration method. This circuit is an important element of the invention and will be described below.

The detection device 1 comprises a memory 50, comprising correction factors determined by the calibration process described in detail below. For each correction parameter, a correction factor $j_k$ is associated for different values k of said correction parameter.

The detection device 1 also comprises an electronic correction circuit 60 capable of applying a correction factor $j_k$ to an electrode signal S, dependent on the value k of at least one position parameter of each interaction in the semiconducting material 11. In particular, these factors can be taken from the memory 50. In general, a correction factor is assigned to the amplitude A of the signal S from the winning anode A0 (or possibly to the signal from the winning cathode K0). This amplitude is then corrected as a function of the value k of said position parameter, as explained below.

The detection device is capable of detecting ionising radiation. The term ionising radiation denotes radiation capable of generating charge carriers in the detector 11. In particular, it can be X-radiation, γ radiation, charged particles (particularly α or β particles) or neutrons.

Amplification circuits 22, 23 and the localisation circuit 30 are known and will not be described in detail.

The calibration method used by the electronic calibration circuit 40 will now be described with reference to FIG. 2A. Its function is to determine a correction factor $j_k$, for different values k of a position factor, this correction factor will subsequently be applied to the amplitude of a signal S collected by an electrode, and more particularly by the winning anode, when this signal is the result of an interaction for which the value of the position parameter is equal to k.

Thus, one objective of the invention is to make it possible to weight the amplitude of a signal detected by a correction factor determined as a function of the position of the interaction in the detector, to take account of the spatial heterogeneity of the detector response.

The electronic calibration circuit 40 is configured to calibrate the detection device 1, so as to correct the spatial heterogeneity of its response. This calibration circuit is implemented when the detection device 1 is in a calibration mode.

The basic concept of calibration is to irradiate the detection device 1 with a known source of ionising radiation, called the reference source $S_{ref}$, for which the theoretical response of the detection device is known. The objective then is to analyse signals generated in response to this irradiation, and to determine an appropriate correction based on the theoretical response of the detector facing this reference source, this theoretical response possibly being qualified as a reference response.

FIG. 2 represents the steps in a first embodiment of the calibration method. In a first step 100, a reference source $S_{ref}$ is placed facing the detection device 1, knowing that the response $Sp_{ref}$ of the device in this configuration is known. In this example, the response of the detector is an energy spectrum, produced by the detector in response to the source.

An energy spectrum means the amplitude distribution of signals S output from an electrode E during exposure of the detector to a radiation source. Such a spectrum is in the form of a histogram Sp in which each term Sp(i) represents the number of signals detected by the electrode considered, with an amplitude equal to i. Amplitude equal to i means an amplitude within the amplitude range Δi containing the value i and for example centred around the value i.

This response can also be determined by modelling the detector. It can also be determined experimentally, by adopting a sufficiently long acquisition time to be statistically representative. The responses obtained on each elementary anode 13x can then be averaged to form a reference response $Sp_{ref}$ of the detector facing the source. Alternatively, the response can be determined by selected interactions that have a determined position parameter, and by making the amplitude spectrum of signals collected during these interactions.

In the example considered, the reference response $Sp_{ref}$ is an energy spectrum corresponding to the spectrum "theoretically" produced by the detector 11 in response to the reference source Sref.

Figure 3:
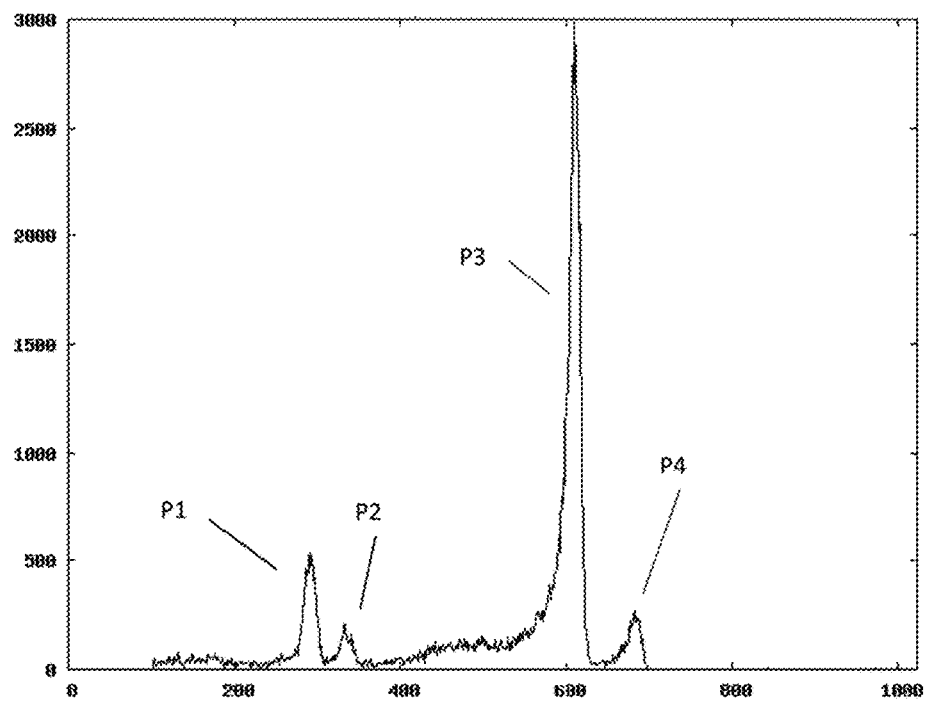
FIG. 3 represents an example of a reference spectrum Spref.

FIG. 3 represents such a reference spectrum $Sp_{ref}$. It comprises several peaks P1, P2, P3, P4 standing out from the background noise B. It is preferable if the initial reference spectrum Spref comprises at least one peak, and preferably between 1 and 20 peaks. Preferably, the width of a peak at its mid-height is less than a tenth or even a twentieth or thirtieth of the range of the spectrum, which is the range of amplitudes over which the spectrum is recorded. Preferably, each peak has a height equal to at least twice, and preferably at least five times, the noise level on each side of the peak. The example in FIG. 3 represents the spectrum for a $^{57}$Co source. The photoelectric peak corresponding to the emission of gamma photons with an energy of 122 keV, and the X-fluorescence peaks of the material from which the collimator of the source is made, in this case Tungsten, can be seen.

Such a spectrum $Sp_{ref}$ can be treated like a probability distribution of measuring a given amplitude knowing the source irradiating the detector.

The first step 100 in the calibration method is to load a reference spectrum $Sp_{ref}$, corresponding to a reference source Sref. This reference spectrum is designated the initial reference spectrum.

The purpose of the second step 200 is to start from the initial reference spectrum $Sp_{ref}$ and produce a plurality of reference spectra $Sp_{refj}$, each being associated with a correction factor j. Each spectrum $Sp_{refj}$ corresponds to the initial reference spectrum $Sp_{ref}$ taking account of a correction factor equal to j. A correction factor j is a positive coefficient between a minimum value $j_{min}$ and a maximum value $j_{max}$. $j_{min}$ and $j_{max}$ are defined arbitrarily. In this example, 0.82≤j≤2. Preferably, the interval $j_{min}$<1 and $j_{max}$>1. The values of j are selected and predetermined.

More precisely, if $Sp_{ref}(i)$ designates the value of the spectrum $Sp_{ref}$ corresponding to the channel with amplitude i, the reference spectrum associated with the correction coefficient j can be written $Spref_j(i)=Sp_{ref}(i/j)$. Each channel of a spectrum $Sp_{refj}$ represents the number of signals collected with an amplitude within an interval $$\frac{\Delta i}{j}$$

centred around the value $$\frac{i}{j}.$$

The above equation can also include a normalisation term $K_{norm}(j)$, that can be equal to 1 or equal to 1/j, in which case $$(i) = \frac{Spref\ (i/j)}{j}.$$

Such a normalisation makes it possible to keep the entire spectrum Spref.

When the correction factor j is more than 1, the reference spectrum $Spref_j$ corresponds to compression of the initial reference spectrum Spref, to the extent that the information in the spectrum is concentrated on a number of channels smaller than the number of channels making up the spectrum Spref.

Conversely, when the correction factor j is less than 1, the reference spectrum $Spref_j$ corresponds to expansion of the initial reference spectrum Spref, the information in the spectrum being expanded to a number of channels larger than the number of channels making up the initial reference spectrum Spref.

Figure 4:
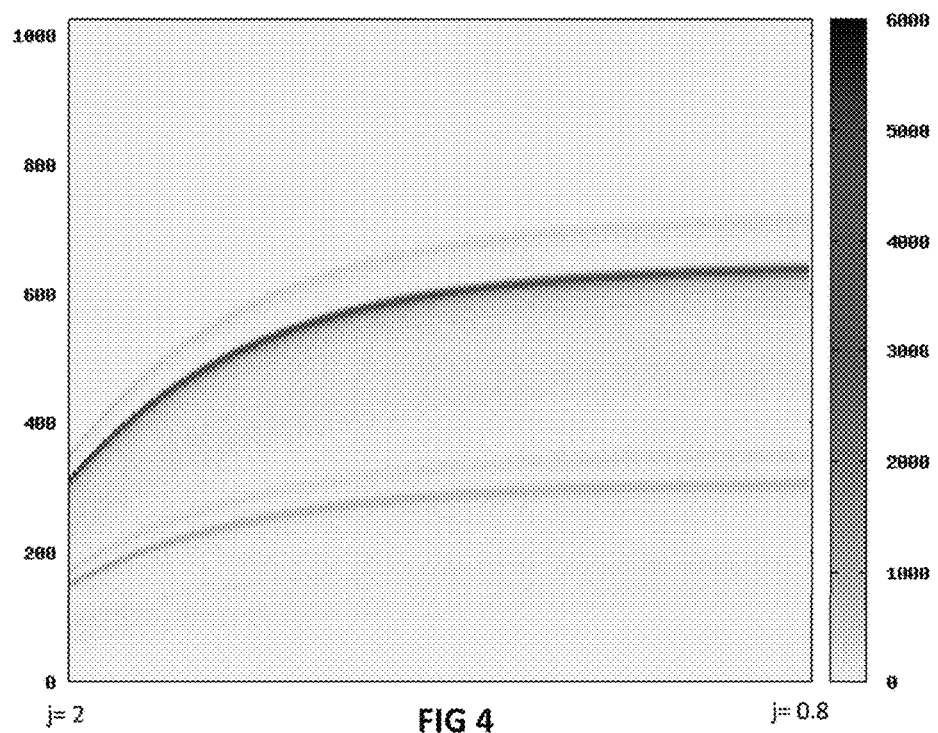
FIG. 4 represents a plurality of corrected reference spectra $Spref_j$.

FIG. 4 shows several reference spectra $Spref_j$ associated with a correction coefficient j between 0.8 and 2. It can be seen on FIG. 4 that the abscissa scale is not linear. Each column in FIG. 4 corresponding to an abscissa j represents a reference spectrum $Spref_j$. Thus, a weight $P_{ji}$ is assigned to each point (j,i) indicated by the grey levels scale, this weight representing the value of the spectrum $Sp_{refj}$ at amplitude i, such that $P_{ji}=Sprefj(i)$.

Thus, each column in FIG. 4 represents a probability distribution of the amplitude measured by the detector, knowing the correction factor j, when the detector is irradiated by the reference source Sref, the correction factor j being the abscissa of the column. Furthermore, each line in FIG. 4 corresponding to an amplitude i represents a probability distribution of the correction coefficient j, when this amplitude is measured, the detector being irradiated by the reference source Sref.

In other words, when the detector is irradiated by the reference source Sref, if a signal S with amplitude A is measured, the distribution formed by the set of values $Sprefj(A)$, where j is between $j_{min}$ and $j_{max}$, corresponds to a probability distribution of the correction factor j to be applied, knowing the measurement of this amplitude A.

By constructing a plurality of reference spectra $Spref_j$, each reference spectrum $Spref_j$ corresponding to a column with abscissa j on FIG. 4, we can determine a plurality of probability distributions, a correction factor j, knowing a measured amplitude A. These distributions will be used in the next step.

Figure 5:
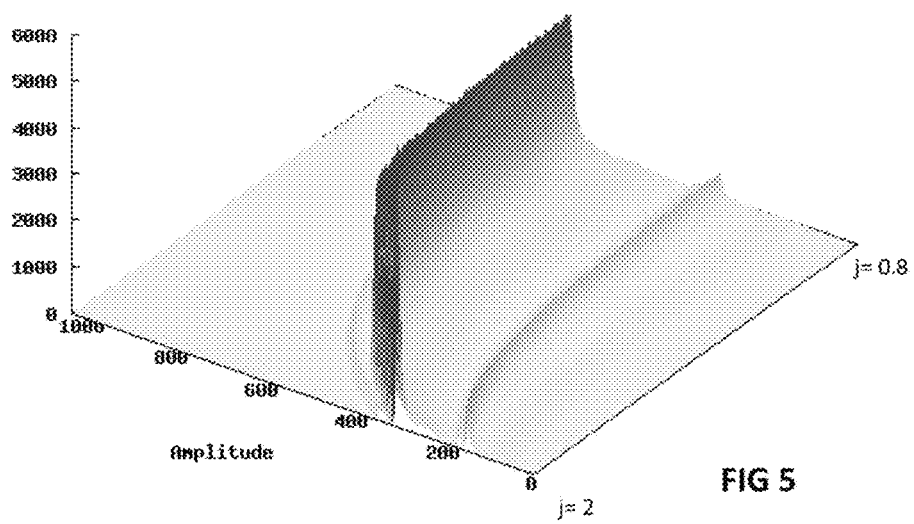
FIG. 5 represents a 3-dimensional view of a plurality of corrected reference spectra $Spref_j$.

FIG. 5 represents a 3-dimensional view of FIG. 4. Each profile, corresponding to a fixed value of the correction factor j, represents a reference spectrum $Sp_{refj}$.

The third step 300 consists of irradiating the detector using a reference radiation source Sref corresponding to the reference spectrum Spref. During each interaction, an electrical signal or a plurality of electrical signals (S, S', S''), is or are collected at the terminals of one or several electrodes (E, E', E''), and processed by the amplification circuit attached to each electrode. As described above, the value k of a position parameter is assigned to each detected interaction, as a function of the signal S or signals S, S', S''. The position parameter can correspond to a position of the interaction in the anode plane, in which case the value corresponds to a coordinate ($X_{INT}$, $Y_{INT}$) of the interaction in the anode plane. The position parameter can correspond to an interaction depth $Z_{INT}$, in which case an interaction is said to be deeper when it is closer to the anode. In this case, the value of the position parameter corresponds to a coordinate of the interaction along an axis perpendicular to the anode and to the cathode.

In a first example, it is considered that the position parameter represents a position $(X_{INT}, YI_{NT})$ in the anode plane 13 when the anode plane is divided into coplanar elementary anodes $13_1 \ldots 13_p$. When these elementary anodes are close enough to each other, electrons generated by an interaction are collected by several generally adjacent elementary anodes $13_x$. These signals are collected simultaneously, and each processing circuit $23_x$, connected to an elementary anode $13_x$ that has collected a significant quantity of charges, outputs a signal S with amplitude A.

These signals S are addressed to the localisation circuit 30, that determines the anode A0 that collected the maximum signal, called the winning anode, and the anode A1 called the secondary anode for which the signal $S_{A1}$ is the signal with the maximum amplitude $A_{A1}$ among the different anodes adjacent to the winning anode A0.

The localisation circuit 30 determines a ratio between the amplitude of the signal output by the secondary anode denoted $A_{A1}$ and the amplitude of the signal output by the winning anode denoted $A_{A0}$.

The ratio $A_{A1}/A_{A0}$ corresponds to a charge sharing factor. A function g can be established assigning a value k of the position parameter of the interaction as a function of this ratio. In other words, $k=f(A_{A1}/A_{A0})$.

More precisely, if the coordinates of the centres of the winning anode A0 and of the secondary anode A1 are $(X_0, Y_0)$ and $(X_1, Y_1)$ respectively, the coordinates $(X_{INT}, Y_{INT})$ of the interaction INT are located on the straight line passing through $(X_0, Y_0)$ and $(X_1, Y_1)$, the distance of the winning anode A0 from the centre $(X_0, Y_0)$ depending on the position of the position parameter k. As this parameter is reduced, the number of charge carriers collected by the winning anode A0 relative to the number collected on the secondary anode A1 increases, and $(X_{INT}, Y_{INT})$ becomes closer to $(X_0, Y_0)$. Thus, the position of the interaction is determined:

firstly from the coordinates of the centre $(X_0, Y_0)$ of the winning anode A0 and the centre $(X_1, Y_1)$ of the secondary anode A1, secondly from the value k of the ratio A1/A0: for example, when A1/A0=0, $(X_{INT}, Y_{INT})=(X_0, Y_0)$ and when A1/A0=1, $$(X_{INT}, Y_{INT}) = \left(\frac{X0 + X1}{2}, \frac{Y0 + Y1}{2}\right).$$

The localisation circuit 30 then calculates the value k of the position parameter of the interaction, by taking a ratio between the amplitudes $A_{A1}$ and $A_{A0}$.

The fourth step 400 consists of determining a calibration function $F_k$ associated with different values k of the position parameter. More precisely, during this step, the calibration function $F_k$ associated with the value k of the position parameter of the interaction detected during the previous step 300 is updated.

Initially, each calibration function $F_k$ is initialised to a predetermined value, for example a null value: regardless of the value of j, $F_k(j)=0$. This fourth step in the method consists of updating each function $F_k$ such that every time that an interaction is detected for which the position parameter is equal to k, the value of the corrected reference spectrum $Spref_j$ corresponding to the amplitude A of the signal measured at each interaction is added to each term $F_k(j)$, for j between $j_{min}$ and $j_{max}$.

In other words, for each detected interaction, the value k of the position parameter of this interaction is determined and the calibration function $F_k$ associated with the position parameter k is then updated, using the iterative equation:

For all values of j between $j_{min}$ and $j_{max}$, $$F_k^p(j) = F_k^{p-1}(j) + Spref_j(A)$$

in which:

$F_k^{p-1}(j)$ is the value of the term $F_k(j)$ before iteration i, $F_k^p(j)$ is the value of the term $F_k(j)$ after iteration i, A is the amplitude of the signal S measured by an electrode following an interaction for which the position parameter is equal to k. In this example, the signal $S_{A0}$ measured by the winning anode A0 is considered, therefore $A=A_{A0}$.

This iterative update is made for a plurality of detected interactions having a position parameter with the same value k until a stop criterion is reached, for example a predetermined number of iterations or a maximum value reached by one or several values of the function $F_k$.

Figure 6:
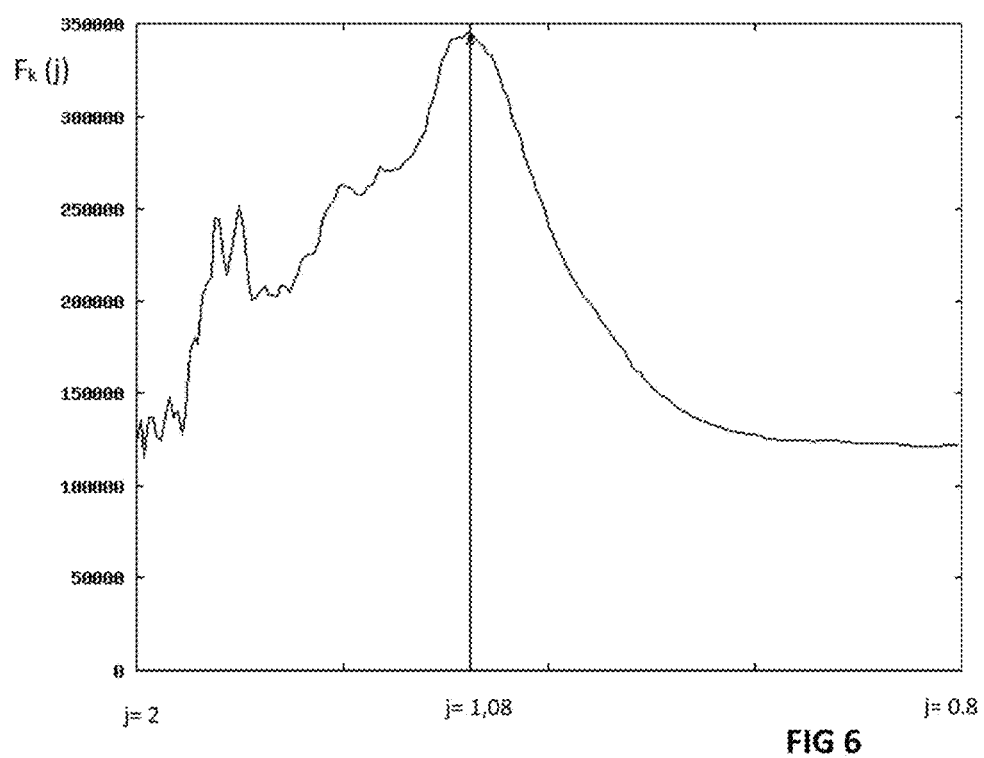
FIG. 6 represents a calibration function $F_k$, when the position parameter k corresponds to the position of the interaction between a cathode and an anode.

FIG. 6 shows a function $F_k$ made after a number of updates equal to 1000, for a position parameter with a value k equal to 0.35. The abscissas axis represents correction factors j, including between jmin and jmax. The ordinates axis represents values of the calibration function $F_k(j)$.

The calibration circuit 40 produces a calibration function denoted $F_k$ for different values k of this position parameter, each function $F_k$ representing the probability distribution of the correction factor j to be applied when the position parameter of an interaction is equal to k. More precisely, each term $F_k(j)$ is proportional to the probability that the correction factor to be applied to each interaction for which the position parameter is equal to k, is equal to j.

The fifth step 500 is determination of the correction factor $j_k$ associated with each value k of the position parameter as a function of a remarkable point of the calibration function $F_k$ associated with this value k, and for example as a function of the correction factor j for which the value of the function $F_k$ is maximum.

In this example, $j_k = \text{argmax}[F_k(j)]$. Returning to the example in FIG. 6, the maximum value of this calibration function occurs at j=1.08. This, in this example, $j_k$=1.08. This means that when the value of the position parameter k is 0.35, the correction factor to be applied to the amplitude $A_{A0}$ of the signal from the winning anode is $j_{k=0.35}$=1.08.

Figure 8:
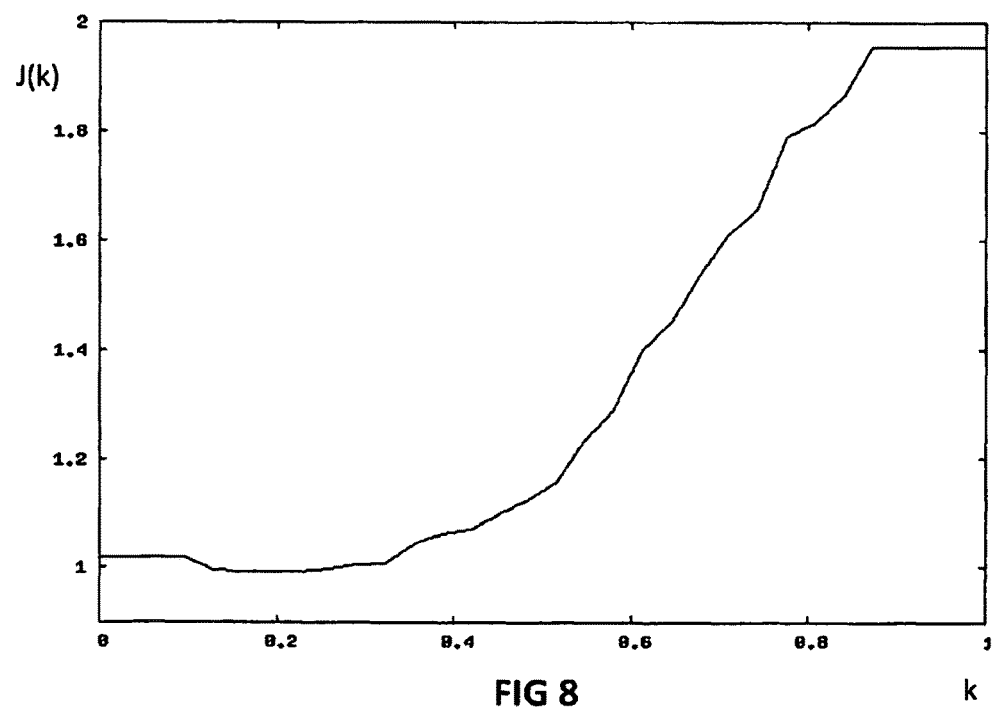
FIG. 8 represents an example of how the correction function jk changes as a function of the values k of the position parameter, when the position parameter corresponds to the position of the interaction in the anode plane, the anode being segmented into elementary anodes.

FIG. 8 shows the correction function J associated with the correction parameter, each term J(k) representing the correction factor $j_k$ to be adopted as a function of the value k of the position parameter, the latter representing the position $(X_{INT}, Y_{INT})$, relative to an elementary anode at the position $(X_0, Y_0)$ of the interaction in the anode plane as explained above.

Each correction factor $j_k$ thus determined is stored in a memory 50, that is dealt with in the sixth step 600. Storage can be in the form of a table called the calibration table, making a correspondence between the value k of the position parameter and the correction factor $j_k$.

According to one variant of this embodiment shown on FIG. 2B, steps c) to e) can be performed iteratively for the same value k of the position parameter, the correction factor corresponding to the value k of the position parameter determined during each rank q iteration being qualified as a partial correction factor and denoted $j_k^q$.

After the first iteration, during the update of the calibration function $F_k$ associated with each value k of the position parameter, the amplitude A of the signal S is weighted by the product of the correction factors $j_k^1 \ldots j_k^q$ corresponding to said value k, determined during the previous iteration or during the q previous iterations, where q denotes the rank of the iteration. Such a product $j_k^1 \times \ldots \times j_k^q$ corresponds to an "intermediate" correction factor associated with the value k.

During step e) of the last iteration, q=Q, where Q denotes the number of iterations, the correction factor $j_k$ associated with the value k of the position parameter is calculated by making the product of partial correction factors $j_k^1 \ldots j_k^Q$ successively acquired during each series. It is found that during the iterations, the values of partial correction factors gradually tend towards 1.

Thus, before the first iteration, the correction factor associated with the value k, denoted $j_k^0$, is initialised to a predetermined value, for example equal to 1. Each iteration q leads to the determination of a partial correction factor $j_k^q$, each partial correction factor making up the intermediate correction factor $\Pi_{l=1}^{l=q} j_k^l$ used as a weighting term of the amplitude measured during the next iteration, rank q+1. During step e) of the last iteration, we can determine $j_k$ such that:

$$j_k = \Pi_{l=1}^{l=Q} j_k^l$$

In other words, during step e) of the last iteration, the correction factor $j_k$ associated with the value k of the position parameter is determined as a function of the product of partial correction factors corresponding to the same value k of the position parameter, these partial correction factors having been determined during previous iterations.

For example, if a series designates the determination of partial correction factors $j_k^q$ by applying steps c) to e) described above, during each series, step d) includes an iterative update to the calibration function $F_k$ such that:

For any value of j between $j_{min}$ and $j_{max}$; in which:

$$F_k^{p,q}(j) = F_k^{p-1,q}(j) + Sprefj(\Pi_{l=1}^{q-1} j_k^l \times A)$$

$F_k^{p-1,q}(j)$ is the value of the term $F_k(j)$ before the $p^{th}$ iteration, during the rank q series (the term series used herein denotes iteration q in which the partial correction factor $j_k^q$) is determined, $F_k^{p,q}(j)$ is the value of the term $F_k(j)$ after the $p^{th}$ iteration, during the rank q series A is the amplitude of the signal S measured by an electrode following an interaction for which the position parameter is equal to k. In this example, the signal $S_{A0}$ measured by the winning anode A0 is considered, therefore $A=A_{A0}$, p is the iteration index corresponding to the update to the calibration function. During the first update, p=1, $j_k^l$ is the partial correction factor associated with the value k of the position parameter determined during series l, where $1 \leq l \leq q-1$.

Steps c) to e) are then repeated until a stop criterion is reached; this may be a predetermined number of series, or a small difference between two successive partial correction factors $j_k^q$ and $j_k^{q+1}$.

Typically, according to this variant, the number Q of series is between 2 and 10.

According to a second example, the position parameter represents the interaction depth $Z_{INT}$, determined as a function of the winning anode signal and the cathode signal. More precisely, the localisation circuit 30 determines the winning anode by comparing the different signals emitted by the electronic circuits 23x. It then determines the ratio between the amplitude $A_K$ of the cathode signal output by the cathode electronic circuit 22, and the amplitude $A_{A0}$ of the winning anode signal. The localisation circuit 30 then calculates the value k of the position parameter of the interaction, taking a ratio between the amplitudes $A_K$ and $A_{A0}$, as described in the publication by He, Zhong "1-D position sensitive single carrier semiconductor detectors", Nuclear Instruments and Methods in Physics Research, A 380 (1996) 228-231.

A function g can be established assigning an interaction depth in the detector as a function of this ratio. In other words, $k=g(A_K/A_{A0})$.

The position parameter can then be equal to different values k, between a minimum value kmin (interaction adjacent to the anode) and a maximum value kmax (interaction adjacent to the cathode).

The calibration method according to this second example reproduces the same steps as that in the previous example:

$1^{st}$ step 100: load a reference spectrum Spref, corresponding to a reference source Sref.

$2^{nd}$ step 200: create a plurality of corrected reference spectra Sprefj, these reference spectra being obtained from the reference spectrum Spref, by the relation Sprefj(i)=Spref(i/j). Preferably, a normalisation term is introduced such that:

$$Sprefj(i) = \frac{Spref(i/j)}{j}$$

These first two steps correspond to the first two steps in the first example.

$3^{rd}$ step 300: irradiation of the detector using the reference source Sref, and determination of the value k of the position parameter and the Amplitude A of the signal S measured by an electrode, for each interaction. In this example, the amplitude A is the amplitude $A_{A0}$ of the signal $S_{A0}$ measured by the winning anode A0, and the amplitude $A_K$ of the signal $A_K$ measured by the cathode.

$4^{th}$ step 400: For each detected interaction, update the calibration function $F_k$, where k is the value of the position parameter.

Function $F_k$ is updated based on the same principles as in the previous example, and for example according to the iterative expression:

For all values of j between $j_{min}$ and $j_{max}$, $$F_k^p(j) = F_k^{p-1}(j) + Spref_j(A)$$

in which:

$F_k^{p-1}(j)$ is the value of the term $F_k(j)$ before iteration p, $F_k^p(j)$ is the value of the term $F_k(j)$ after iteration p, A is the amplitude of the signal S measured by an electrode following an interaction that occurs at coordinate k. In this example, the signal $S_{A0}$ measured by the winning anode A0 is considered, therefore $A=A_{A0}$.

In the same way as in the previous example, each calibration function $F_k$ is initialised to an arbitrary value, all values of this function can be initialised to 0.

$5^{th}$ step 500: determine the correction factor $j_k$ associated with each value k of the position parameter starting from the calibration function $F_k$. In the same way as in the first example, each factor $j_k$ can be such that: $j_k = \text{argmax}[F_k(j)]$.

Figure 7:
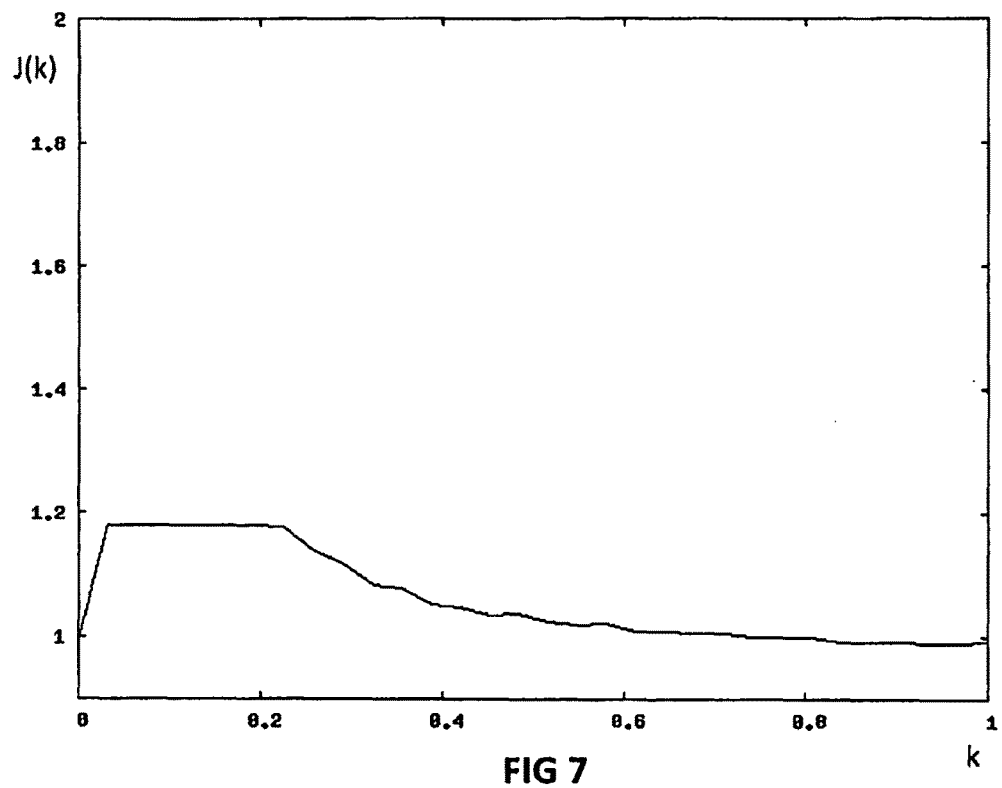
FIG. 7 represents an example of how the correction function $j_k$ changes as a function of the values k of the position parameter, when the position parameter corresponds to the position of the interaction between a cathode and an anode.

FIG. 7 represents the correction function J associated with each different value k of the position parameter considered, each term J(k) of this function corresponding to the correction factor $j_k$ to be applied when the value of the position parameter considered is equal to k. On this figure, the position parameters are normalised and are between a value kmin=0 and a value kmax=1.

6$^{th}$ step 600: memorise correction factors $j_k$ corresponding to each value k of the position parameter considered.

Figure 9:
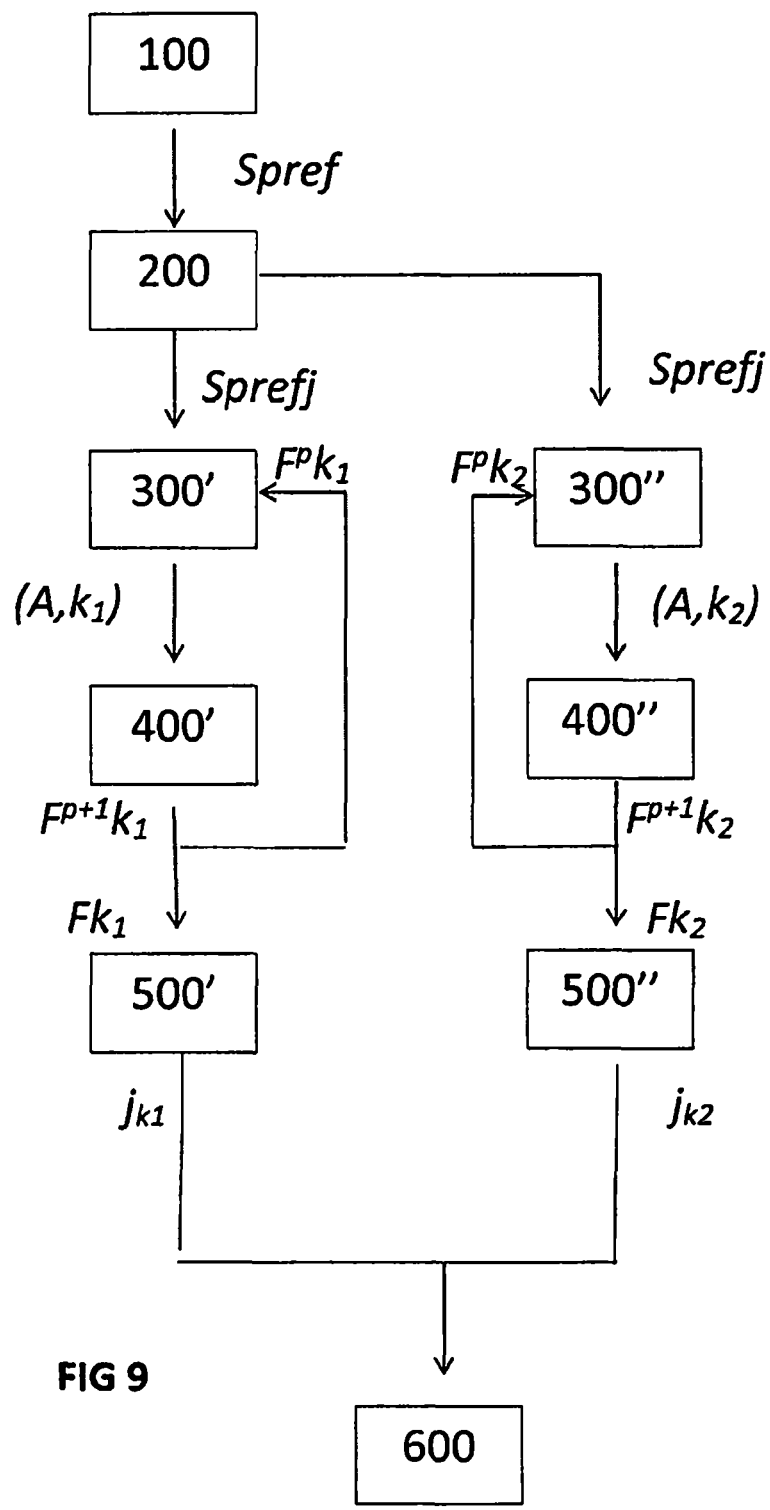
FIG. 9 represents the different steps of the calibration method according to a second embodiment of the invention.

According to a third example represented on FIG. 9, two calibrations are made in sequence:

i a first calibration called the in-depth calibration, determining the first correction factors $j_{k1}$ as a function of the value $k_1$ of a first correction parameter corresponding to the interaction depth, in other words the interaction distance from the anode 13, ii A second calibration called the in-anode plane calibration, determining the second correction factors $j_{k2}$ as a function of the value $k_2$ of a second correction parameter dependent on the position of the interaction in the plane of the anode 13.

The advantage related to this third example is that there is a pair of correction factors ($j_{k1}$, $j_{k2}$) as a function of the position of the interaction according to the detector depth and in the anode plane 13 respectively. The correction factors ($j_{k1}$, $j_{k2}$) then take account of the position of the interaction in the detector material 11, in 3 dimensions.

The order in which these calibrations are made is not important; depending on the interaction depth, the first calibration may be made before or after the second calibration, depending on the position in the anode plane 13.

However, such a calibration can be further improved. When two successive calibrations are made according to two different position parameters (k1, k2), these two calibrations are made independently of each other. During the in-depth calibration, the position parameter defined from the K/A0 ratio is itself affected by an error related to the position of the interaction in the anode plane 13, since it is determined using the signal from the winning anode, that has not been corrected. Similarly, during the in-anode plane calibration, the position parameter defined from the A1/A0 ratio is affected by the depth of the interaction, since it is determined using the signal from the winning anode, that has not been corrected.

An iterative calibration is performed as described in the fourth example, to make a more precise calibration.

Figure 10:
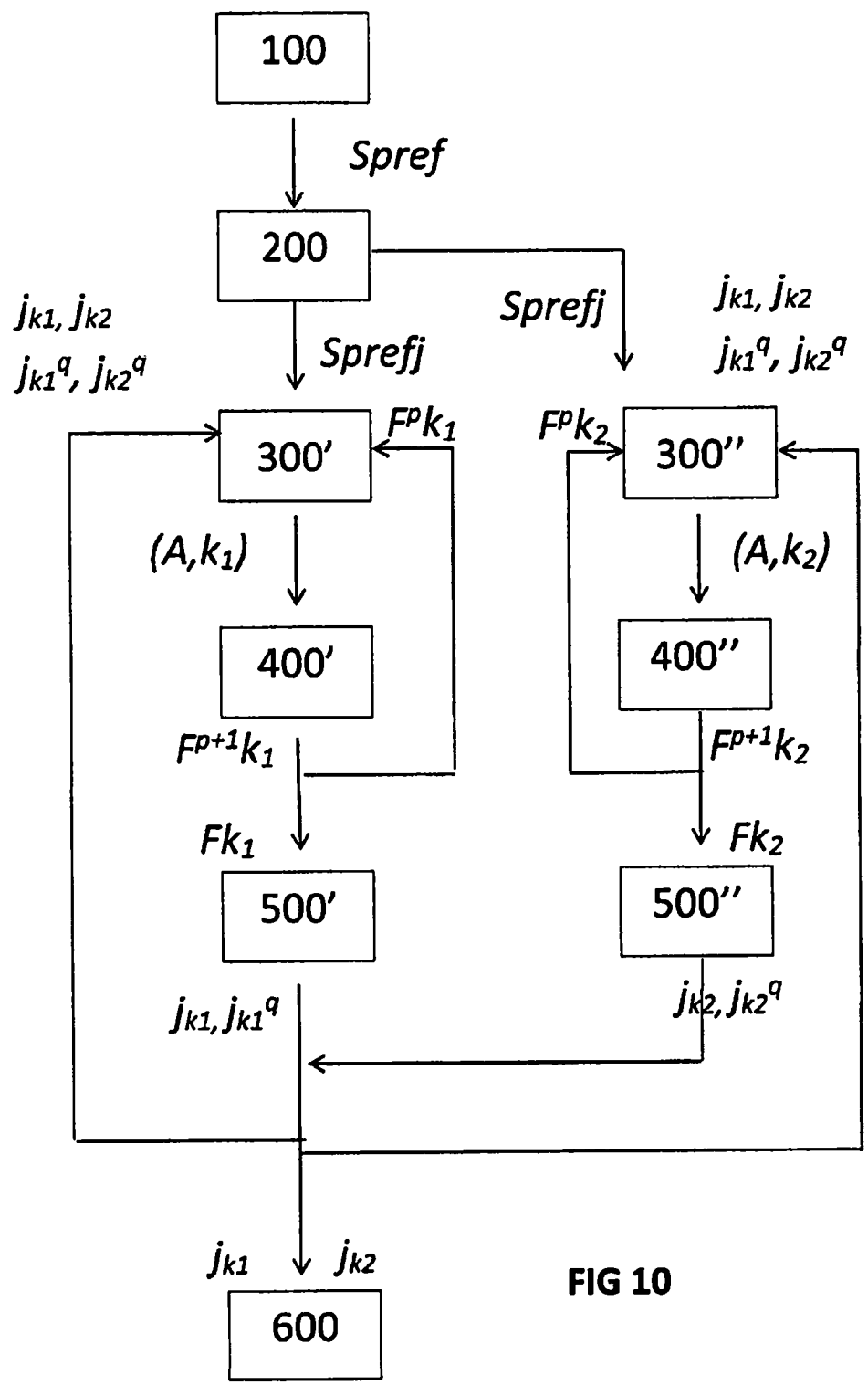
FIG. 10 represents the different steps of the calibration method according to a third embodiment of the invention.

According to this fourth example shown on FIG. 10, steps 100 and 200 described above are performed and then, alternatively, the following are considered i a first position parameter, for example, the interaction depth, defined by the ratio $A_K/A_{A0}$. This makes it possible to establish a set of first correction factors $j_{k1}$, relative to the first correction factor k1, ii a second position parameter, for example, the position of the interaction in the anode plane defined by the ratio $A_{A1}/A_{A0}$. This makes it possible to build up a second base of correction factors $j_{k2}$, relative to the second correction factor k2, Then, iteratively, A step 300' is performed considering said first position parameter, this step being similar to the step 300 defined above. However, the value $k_2$ of the second position parameter is also determined, during step 300'. When the calibration function $F_{k1}$ is updated, each measured amplitude is weighted by the correction factor $j_{k2}$ associated with the value $k_2$ of the second correction factor.

The correction factors $j_{k1}$ and $j_{k2}$ associated with all values of the first and second correction factors are firstly initialised to an arbitrary value, for example 1.

More precisely, step 300' includes:
irradiation of the detector using the reference source Sref,
in each interaction, determine the value $k_1$ of the first position parameter and the value $k_2$ of the second position parameter, and update a calibration function $F_{k1}$ associated with said value k1 of the first position parameter according to the following formula:
For all values of j between $j_{min}$ and $j_{max}$, $$F_{k1}^{p}(j)=F_{k1}^{p-1}(j)+\text{Spref}_j(j_{k2} \times A)$$

in which:
$F_{k1}^{p-1}(j)$ is the value of the term $F_{k1}(j)$ before iteration p,
$F_{k1}^{p}(j)$ is the value of the term $F_{k1}(j)$ after iteration p,
A is the amplitude of the signal S measured by an electrode following an interaction. In this example, the signal $S_{A0}$ measured by the winning anode A0 is considered, therefore $A=A_{A0}$,
$j_{k2}$ is the correction factor corresponding to the value $k_2$ of the second position parameter, this parameter being either initialised to an arbitrary value $j_{k2}^{0}$ (for example 1) or determined in advance.

In the same way as in the previous examples, each calibration function $F_{k1}$ is initialised to an arbitrary value, all values of this function can be initialised to 0.

The next step 400' is similar to step 400 described above. It includes an update to correction factors $j_{k1}$ associated with the position parameter k1, as a function of the calibration function $F_{k1}$ associated with this parameter position k1: $j_{k1}=\text{argmax}_j[F_{k1}(j)]$. We then determine the correction function $J_1$, such that $J_1(k_1)=j_{k1}$.

A step 300'' is performed symmetrically, considering said second position parameter, this step being similar to the step 300 defined above. However, the value k1 of the first position parameter is also determined in step 300''. During the update to the calibration function $F_{K2}$ associated with the value $k_2$ of the second parameter, the value $k_1$ of the first correction factor $j_{k1}$, associated with the first correction parameter is used as a weighting term. More precisely, step 300'' includes:

i irradiation of the detector using the reference source Sref,
ii In each interaction, determine the value $k_1$ of the first position parameter and the value $k_2$ of the second position parameter, and update a calibration function $F_{k1}$ associated with said value k1 of the first position parameter according to the following formula:

For all values of j between $j_{min}$ and $j_{max}$, $$F_{k2}^{p-1}(j)=F_{k2}^{p}(j)+\text{Spref}_j(j_{k1} \times A)$$

in which:
$F_{k2}^{p-1}(j)$ is the value of the term $F_{k2}(j)$ before the update,
$F_{k2}^{p}(j)$ is the value of the term $F_{k2}(j)$ after the update,
A is the amplitude of the signal S measured by an electrode following an interaction. In this example, the signal $S_{A0}$ measured by the winning anode A0 is considered, therefore $A=A_{A0}$,
$j_{k1}$ is the correction factor corresponding to the value $k_1$ of the previously determined value of the first position parameter $k_1$.

In the same way as in the previous examples, each calibration function $F_{k2}$ is initialised to an arbitrary value, all values of this function can be initialised to 0.

The next step 400'' is similar to step 400 described above. It includes an update to correction factors $j_{k2}$ associated with the position parameter $k_2$, as a function of the calibration function $F_{k2}$ associated with the value $k_2$ of this second position parameter, according to the equation $j_{k2}=\text{argmax}_j[F_{k2}(j)]$. We then determine the correction function $J_2$, such that $J_2(k_2)=j_{k2}$.

The method described according to this embodiment can be generalised to include the determination of N position parameters; the calibration method then comprising:

the determination of N sets of correction factors, each set being associated with an $i^{th}$ position parameter, where $1 \leq i \leq N$, and $N \geq 1$, each set comprising one correction factor $j_{ki}$ for each possible value ki that can be adopted by the $i^{th}$ position factor ki. In other words, according to this embodiment, N correction functions $J_{ki}$ are determined, each correction function assigning a correction factor $j_{ki}$ as a function of the value ki taken by the $i^{th}$ position parameter, according to the expression $j_{ki}=J_{ki}(ki)$. This determination is made for each correction parameter by repeating steps 100 to 600 described above.

values of a correction set $j_{ki}$ are adjusted by the following steps:
irradiation of the detector with said reference source,
at each interaction, determine the values of the different position parameters, and update a calibration function $F_{ki}$ associated with the parameter ki, according to the following formula:
For any value of j between $j_{min}$ and $j_{max}$, $$F_{ki}^p(j)=F_{ki}^{p-1}(j)+\text{Sprefj}(\Pi_{i=1}^{N}j_{kn} \times A)$$

in which:
$F_{ki}^{p-1}(j)$ is the value of the term $F_{ki}(j)$ before the update,
$F_{ki}^p(j)$ is the value of the term $F_{ki}(j)$ when the update is made,
A is the amplitude of the signal S measured by an electrode following each interaction of position parameter $k_i$. In this example, the signal $S_{A0}$ measured by the winning anode A0 is considered, therefore $A=AS_{A0}$,
$j_{kn}$ correspond to correction factors corresponding to different values taken on by rank n position parameters, in which $1 \leq i \leq N$, these factors being either initialised to an arbitrary value $J_{kn}^0$, or determined in advance.

According to one variant, steps c), d) and e) are repeated iteratively for the same value ki of said $i^{th}$ position parameter, each step e) leading to the determination of a partial correction factor $j_{ki}^{qi}$, in which qi designates the rank of the iteration associated with the value ki of the $i^{th}$ position parameter, After the first iteration, step d) comprises the update of each term $F_{ki}(j)$ by weighting said amplitude A by the product of partial correction factors $j_{ki}^1 \ldots j_{ki}^q$, associated with the value ki of the $i^{th}$ position parameter of the interaction, these partial correction factors having been determined during the previous $q_i$ iterations. It is found that during the iterations, the values of partial correction factors progressively tend towards 1.

Step e) of the last iteration of the method then consists of determining the correction factor $j_{ki}$ associated with each value ki of the $i^{th}$ position parameter as a function of the product of partial correction factors $j_{ki}^1 \ldots j_{ki}^{Qi}$ determined during successive iterations, $Q_i$ designating the number of iterations necessary for the value $k_i$ of the $i^{th}$ position parameter. Typically, according to this variant, Qi is between 2 and 10.

Thus, before the first iteration, the correction factor associated with the value k, denoted $k_i$, denoted $j_{ki}^0$, is initialised to a predetermined value, for example equal to 1. Each iteration $_l$ leads to the determination of a partial correction factor $j_{ki}^{qi}$, each partial correction factor making up the intermediate correction factor $\Pi_{l=1}^{l=qi}j_{ki}^l$ used as weighting term for the amplitude measured during the next iteration, rank $q_{l+1}$. During step e) of the last iteration, we can determine $j_{ki}$ such that:

$$j_{ki}=\Pi_{l=1}^{l=Qi}j_{ki}^l$$

In other words, during step e) of the last iteration, the correction factor $j_{ki}$ associated with the value $k_i$ of the $i^{th}$ position parameter is determined as a function of the product of partial correction factors corresponding to the same value $k_i$ of the $i^{th}$ position parameter, these partial correction factors having been determined during the previous iterations.

For example, if a series designates the determination of partial correction factors $j_{ki}^{qi}$ by applying steps c) to e) described above, during each series, step d) includes an iterative update to the calibration function $F_k$ such that:
For any value of j between $j_{min}$ and $j_{max}$; in which:

$$F_{ki}^{p,qi}(j)=F_{ki}^{p-1,qi}(j)+\text{Sprefj}(\Pi_{l=1}^{qi-1}j_{ki}^l \times K \times A)$$

$F_{ki}^{p-1,q}(j)$ is the value of the term $F_{ki}(j)$ before the $p^{th}$ iteration, during the rank q series (in this case each series represents an iteration to determine a partial correction factor $j_{ki}^{qi}$),
$F_{ki}^{p,q}(j)$ is the value of the term $F_{ki}(j)$ after the $p^{th}$ iteration, during the rank q series
A is the amplitude of the signal S measured by an electrode following an interaction for which the position parameter is equal to $k_i$. In this example, the signal $S_{A0}$ measured by the winning anode A0 is considered, therefore $A=A_{A0}$.
p is the iteration index corresponding to the rank of the update to the calibration function. During the first update, p=1,
$j_{ki}^l$ is the partial correction factor associated with the value k of the position parameter determined during series l, where $1 \leq l \leq q-1$.
K is a weighting factor, obtained from the product of correction factors $j_{kn}$, or the product of partial correction factors $j_{kn}^1 \ldots j_{kn}^{qn}$, associated with the values of other position parameters of the interaction. More precisely, the magnitude K includes the product of weighting terms $t_n$, each weighting term being associated with value $k_n$ of each $n^{th}$ position parameter, where $n \neq i$, and each term $t_n$ being equal to:
either the initial value of the correction factor $j_{kn}^0$ $j_{kn}$, for example fixed at 1,
or an intermediate value of the correction factor $j_{kn}$, corresponding to the product of each partial correction factor, $j_{kn}^1 \times \ldots \times j_{kn}^{qn}$, in which $\Pi_{l=1}^{l=qn}j_{kn}^l$, qn designates the rank of the iteration relative to the value kn,
or the value $j_{kn}$ of the correction factor associated with the value $k_n$, if, for this value kn, a sufficient number of iterations qn=Qn has been reached, in which case $j_{kn}=j_{kn}=\Pi_{l=1}^{l=Qn}j_{kn}^l$.
The formula to update the calibration function according to this example can then be:

$$F_{ki}^{p,qi}(j) = F_{ki}^{p-1,qi}(j) + \text{Sprefj}\left(\prod_{l=1}^{qi-1}j_{ki}^l \prod_{n \neq i} \prod_{l=1}^{qn}j_{kn}^l \times A\right)$$

where qn designates the number of iterations reached to determine the correction factor $j_{kn}$.

Steps c) to e) are then repeated until a stop criterion is reached; this may be a predetermined number of series, a small difference between two successive partial correction factors $j_{ki}^q$ and $j_{ki}^{q+1}$. Typically, according to this variant, the number Qi of iterations is between 2 and 10.

Correction factors of each value $k_i$ of each position parameter are then stored in memory 50.

Regardless of the embodiment, each correction factor $j_k$, $j_{ki}$ associated with the value k,$k_i$ of a position parameter, can be determined for a plurality of discrete values k,$k_i$ of said position parameter. Correction factors associated with values between said discrete values can be determined by interpolation. In particular, it can be a linear interpolation.

We will now describe an example operation of a detection device as shown diagrammatically on FIG. 1.

When an interaction occurs in the detection material 11, it generates a signal on the cathode 12 and on a plurality of adjacent elementary anodes 13x. The localisation circuit 30 determines the winning anode A0 and the secondary anode A1 as a function of electronic signals transmitted by each processing circuit 23x associated with an elementary anode 13x.

The localisation circuit determines the ratio $A_1/A_0$, and it uses the ratio to determine a first position parameter $k_1=f(A_1/A_0)$, representing the coordinates ($X_{INT}$, $Y_{INT}$) of the interaction in the elementary anodes plane.

The localisation circuit 30 then determines the ratio $A_K/A_0$, corresponding to the amplitude of the cathode signal divided by the amplitude of the signal from the winning anode, and as a function of this value it determines a second position parameter $k_2=g(K/A_0)$, representing the coordinate $Z_{INT}$ of the interaction between the elementary anodes 13x and the cathode 12.

The correction circuit 60 searches in the memory 50 for correction parameters $j_{K1}$ and $j_{K2}$ associated with said values $k_1$ and $k_2$ respectively, and then corrects the value of the amplitude of the winning anode $A_0$, weighting it by the product $j_{k1} \times j_{k2}$. The corrected amplitude A* is then such that $A^*=j_{k1} \times j_{k2} \times A_0$.

The calibration circuit 40 is not used during the functional phase of the detector.

What is claimed is:

1. Method of calibrating an ionising radiation detection device (1), the device (1) comprising a detector (10) comprising a semiconducting detection material (11) extending between two electrodes (E, E', E'', 12, 13, 13x), at least one electrode being capable of generating a signal S with amplitude A during an interaction of ionising radiation in said detection material:
   a) irradiation of the detector (10) using a known reference source (Sref) so as to generate interactions in the detector material (11),
   b) selection of a plurality of correction factors (j), and determination of reference spectra ($Sp_{refj}$), each reference spectrum being associated with a correction factor (j), each reference spectrum representing a distribution of the amplitude (A) of the signal (S) generated when the detector is irradiated by said reference source (Sref), the amplitude (A) of the detected signal being weighted by said correction factor (j),
   c) detection of a plurality of interactions in the detector during said irradiation and, for each interaction, measurement of at least one amplitude A of an electronic signal S generated by an electrode E and determination of the value k of at least one position parameter of the interaction as a function of said amplitude A,
   d) for a plurality of values k of said position parameter, determination of a calibration function $F_k$ such that each calibration function $F_k$ is associated with one of said values k of said position parameter
   each calibration function $F_k$ is defined on a plurality of correction factors j,
   each term $F_k(j)$ of said calibration function represents a probability associated with said correction factor j when the position parameter is equal to the value k,
   each term $F_k(j)$ being updated, at each interaction for which the position parameter is equal to the value k with which said calibration function $F_k$ is associated, combining the amplitude A measured during this interaction with each reference spectrum $Sp_{refj}$,
   e) Determination of a correction factor $j_k$ associated with each value k of the position parameter by identifying a remarkable point of said calibration function $F_k$.

2. Calibration method according to claim 1, in which each step d) comprises:
   i initialise each calibration function $F_k$ associated with each value k of said position parameter
   ii at each detected interaction, determine the value k of said position parameter and update the corresponding calibration function $F_k$, by adding the value of the corrected reference spectrum $Spref_j (A)$ to each term $F_k(j)$ in this function, at said amplitude A,
   iii repeat step ii until a predefined stop criterion is reached.

3. Calibration method according to claim 1, in which step e) includes determination of the correction factor $j_k$ associated with the value k of the position parameter by identifying the value of j that maximises the value of the function $F_k$, in which case:

$$j_k = \mathrm{argmax}_j[F_k(j)].$$

4. Calibration method according to claim 1, in which:
   steps c), d) and e) are repeated iteratively for the same value k of said position parameter, each step e) leading to the determination of a partial correction factor $j_k^q$, where q denotes the iteration rank,
   and in which, following the first iteration, step d) comprises the update of each term $F_k(j)$ by weighting said amplitude A by the product of partial correction factors $j_k^1 \ldots j_k^q$, associated with the value k of the position parameter of the interaction, these values having been determined during the previous iterations,
   step e) in the last iteration of the method then consisting of determining the correction factor $j_k$ associated with each value k of the position parameter as a function of the product of partial correction factors $j_k^1 \ldots j_k^Q$ determined during said successive iterations, where Q denotes the number of iterations.

5. Calibration method according to claim 1, comprising:
   step c), determination of a set of N interaction position parameters as a function of the signal S, where N is an integer larger than 1,
   step d), the selection of one position parameter i among the N position parameters, and for a plurality of values $k_i$ of said $i^{th}$ position parameter, the determination of a calibration function $F_{ki}$ such that
   each calibration function $F_{ki}$ is associated with one of said values $k_i$ of said $i^{th}$ position parameter
   each calibration function $F_{ki}$ is defined on a plurality of correction factors j,
   each term $F_{ki}(j)$ of said calibration function represents a probability associated with said correction factor j when the position parameter is equal to the value ki,
   each term $F_{ki}(j)$ being updated at each interaction for which the $i^{th}$ position parameter is equal to the value ki with which said calibration function $F_{ki}$ is associated, by weighting the amplitude A measured during this interaction, by at least one correction factor $j_{kn}$, said correction factor $j_{kn}$, being determined as a function of the value $k_n$ of at least one $n^{th}$ position parameter characterising the interaction, and combining the amplitude A thus weighted with each reference spectrum $Sp_{refj}$, in step e), determination of the correction factor $j_{ki}$ associated with each value $k_i$ of the $i^{th}$ position parameter as a function of said calibration function $F_{ki}$ associated with the $i^{th}$ position parameter, identifying a remarkable point of this function.

6. Calibration method according to claim 5, in which each step d) comprises:
i initialise each calibration function $F_{ki}$ associated with each value $k_i$ of the ith position parameter $k_i$
ii at each detected interaction
weight the value of the amplitude A measured during this interaction by at least one correction factor $j_{kn}$ dependent on the value $k_n$ of an $n^{th}$ position parameter characterising the interaction,
to each term $F_{ki}(j)$ of said calibration function, add the value of the corrected reference spectrum $Spref_j$ (A*), where A* represents the value of the amplitude thus weighted,
iii repeat step ii until a stop criterion is reached.

7. Calibration method according to claim 5, in which step e) includes determination of the correction factor $j_{ki}$ associated with each value $k_i$ of the $i^{th}$ position parameter by identifying the value of $j_{ki}$ that maximises the value of the function $_{ki}$, in which case:

$$j_{ki} = \mathrm{argmax}_j[F_{ki}(j)].$$

8. Calibration method according to claim 5, in which:
steps c), d) and e) are repeated successively for each value ki of each of the N position parameters characterising each interaction,
and in which step d) comprises the update of each term $F_{ki}(j)$ by weighting said amplitude A by the product of partial correction factors $j_{kn}$, each correction factor $j_{kn}$ being associated with the value $k_n$ of an $n^{th}$ position parameter, each correction factor $j_{kn}$ either being fixed to a predetermined initial value, or determined during a previous iteration.

9. Calibration method according to claim 5, in which:
steps c), d) and e) are repeated iteratively for the same value ki of said $i^{th}$ position parameter, each step e) leading to the determination of a partial correction factor $j_{ki}^{qi}$, where qi denotes the iteration rank,
and in which, following the first iteration, step d) comprises the update of each term $F_{ki}(j)$ by weighting said amplitude A by the product of partial correction factors $j_{ki}^1 \ldots j_{ki}^{qi}$, associated with the value ki of the $i^{th}$ position parameter of the interaction, these factors having been determined during the previous $q_i$ iterations,
the method then includes, in step e) in the last iteration, determining the correction factor $j_k$ associated with each value $k_i$ of the position parameter as a function of the product of partial correction factors $j_{ki}^1 \ldots j_{ki}^{Qi}$ determined during said successive iterations, where $Q_i$ denotes the number of iterations.

10. Calibration method according to claim 9, in which in step d), the calibration function $F_{ki}$ is updated by also weighting the amplitude A by a weighting factor K, this factor being obtained from the product of correction factors $j_{kn}$, or partial correction factors $j_{kn}^1 \ldots j_{kn}^{qn}$ associated with values $k_n$ of the other position parameters of the interaction.

11. Calibration method according to claim 1, in which step b) comprises:
i load an initial reference spectrum $Sp_{ref}$ previously saved in a memory, corresponding to said reference source $S_{ref}$, this spectrum $Sp_{ref}$ representing the distribution of the amplitude of the detected signal when the detector is irradiated by said reference source $S_{ref}$,
ii starting from the initial reference spectrum $Sp_{ref}$, determine a plurality of reference spectra $Sp_{refj}$, corresponding to a correction factor j, each reference spectrum $Sp_{refj}$ having been obtained from the initial reference spectrum $Sp_{ref}$, each value $Sp_{refj}(i)$ of the reference spectrum being obtained from the value Spref (i/j).

12. Calibration method according to claim 1, in which a position parameter k, $k_i$ of an interaction is obtained by combining signals resulting from said interaction output from the different electrodes (12, 13, 13x).

13. Calibration method according to claim 1, in which the anode (13) of the detector is divided into a plurality of elementary anodes (13X) located in a plane, the value $(k,k_i)$ of a position parameter for an interaction is obtained by combining signals resulting from said interaction, said signals being generated,
by an elementary anode (A0) and by a cathode (12), or
by two elementary anodes (A0, A1).

14. Calibration method according to claim 13, in which the anode of the detector is divided into a plurality of elementary anodes located in a plane: the value $(k,k_i)$ of a position parameter for each interaction is obtained by combining signals:
from the elementary anode that collected the signal with the maximum amplitude, called the winning anode (A0),
and from the elementary anode adjacent to the winning anode that collected the signal with the maximum amplitude, called the secondary anode (A1),
in which case the parameter determines the position of said interaction in the plane of said anodes.

15. Calibration method according to claim 13, in which the anode of the detector is divided into a plurality of elementary anodes, and in which the value $(k,k_i)$ of a position parameter for each interaction is obtained by combining signals:
from the elementary anode that collected the signal with the maximum amplitude, called the winning anode (A0),
from the cathode (12, K),
in which case the position parameter determines the position of the interaction between the winning anode and the cathode, this position parameter then corresponding to a detection depth.

16. Device for detection of ionising radiation comprising:
a) a detector (10), comprising a semiconducting detection material (11) extending between two electrodes (12, 13, $13_x$), the detector being capable of generating charge carriers under the effect of an interaction with ionising radiation,
b) an electronic processing circuit (22, $23_x$) capable of forming a signal S from charge carriers collected by an electrode during an interaction and determining its amplitude A,
c) an electronic localisation circuit (30), capable of determining the value (k, $k_i$) of at least one position parameter at the interaction in the detection material from the signal from at least one electrode, d) an electronic calibration circuit (40) configured to implement steps b) to e) in the method according to claim 1.

\* \* \* \* \*

UNITED STATES PATENT AND TRADEMARK OFFICE
CERTIFICATE OF CORRECTION

PATENT NO. : 10,132,944 B2
APPLICATION NO. : 15/538494
DATED : November 20, 2018
INVENTOR(S) : Sylvain Stanchina et al.

Page 1 of 1

It is certified that error appears in the above-identified patent and that said Letters Patent is hereby corrected as shown below:

In the Specification

Column 20, Lines 41 - 45, "ii In each interaction, determine the value $k_1$ of the first position parameter and the value $k_2$ of the second position parameter, and update a calibration function $F_{k1}$ associated with said value $k_1$ of the first position parameter according to the following formula:" should be -- ii In each interaction, determine the value $k_1$ of the first position parameter and the value $k_2$ of the second position parameter, then update a calibration function associated with the value $k_2$ of the second position parameter according to the following formula: --.

Signed and Sealed this
Twelfth Day of February, 2019

Andrei Iancu
*Director of the United States Patent and Trademark Office*